(12) United States Patent
Va et al.

(10) Patent No.: US 10,531,254 B2
(45) Date of Patent: Jan. 7, 2020

(54) MILLIMETER WAVE VEHICLE-TO-VEHICLE COMMUNICATION SYSTEM FOR DATA SHARING

(71) Applicant: TOYOTA JIDOSHA KABUSHIKI KAISHA, Toyota-shi, Aichi-ken (JP)

(72) Inventors: Vutha Va, Mountain View, CA (US); Takayuki Shimizu, Mountain View, CA (US); Gaurav Bansal, Mountain View, CA (US)

( * ) Notice: Subject to any disclaimer, the term of this patent is extended or adjusted under 35 U.S.C. 154(b) by 150 days.

(21) Appl. No.: 15/885,797

(22) Filed: Jan. 31, 2018

(65) Prior Publication Data
US 2019/0239040 A1 Aug. 1, 2019

(51) Int. Cl.
*H04W 72/12* (2009.01)
*H04W 74/04* (2009.01)
*H04W 76/02* (2009.01)
*H04W 4/46* (2018.01)
*H04W 76/10* (2018.01)
*H04W 4/02* (2018.01)

(52) U.S. Cl.
CPC ............ *H04W 4/46* (2018.02); *H04W 72/12* (2013.01); *H04W 76/10* (2018.02); *H04W 4/027* (2013.01)

(58) Field of Classification Search
None
See application file for complete search history.

(56) References Cited

U.S. PATENT DOCUMENTS

| 6,018,659 | A | 1/2000 | Ayyagari et al. |
| 8,730,927 | B2 | 5/2014 | Thoukydides |
| 2005/0280553 | A1* | 12/2005 | Dipiazza ............... G08G 1/01 340/905 |
| 2008/0013519 | A1* | 1/2008 | Kwon ................ H04J 3/1682 370/345 |
| 2011/0038356 | A1* | 2/2011 | Bachrach .......... H04W 72/1231 370/337 |
| 2012/0087292 | A1* | 4/2012 | Grimm ................ H04W 72/02 370/312 |
| 2015/0230263 | A1 | 8/2015 | Roy et al. |
| 2016/0112856 | A1* | 4/2016 | Han ..................... H04W 4/90 455/404.1 |
| 2017/0088144 | A1* | 3/2017 | Shibata .............. B60W 10/20 |
| 2017/0188391 | A1* | 6/2017 | Rajagopal ......... H04W 74/0816 |
| 2017/0311260 | A1* | 10/2017 | Trainin ............. H04W 52/0229 |
| 2019/0045337 | A1* | 2/2019 | Sun ..................... H04W 4/46 |
| 2019/0075559 | A1* | 3/2019 | Chen ................... H04W 4/46 |
| 2019/0124698 | A1* | 4/2019 | Wu ................ H04W 74/0841 |

* cited by examiner

*Primary Examiner* — Duc T Duong
(74) *Attorney, Agent, or Firm* — Burbage Law, P.C.; Jon-Michael Burbage; Elizabeth Ruzich

(57) ABSTRACT

The disclosure includes embodiments for establishing millimeter wave vehicle-to-vehicle communications for data sharing. In some embodiments, a method includes receiving, at an ego vehicle, a first beacon from a first vehicle, wherein the first beacon includes first scheduling information and first localization information and the first beacon is broadcast as a millimeter wave (mmWave) communication. The method includes determining a schedule based on the first scheduling information. The method includes broadcasting a second beacon based on the schedule. The method includes establishing a current link between the ego vehicle and the first vehicle. The method includes transmitting data to the first vehicle using the current link based on the schedule.

20 Claims, 14 Drawing Sheets

MILLIMETER WAVE VEHICLE-TO-VEHICLE COMMUNICATION SYSTEM FOR DATA SHARING

BACKGROUND

The specification relates to establishing millimeter wave vehicle-to-vehicle communications for data sharing. In some embodiments the data is high data rate sensor data.

A millimeter wave (mmWave) message is a wireless message which is transmitted by a mmWave radio, i.e., via mmWave communication, on the band of spectrum between 30 gigahertz (GHz) and 300 GHz. It is currently difficult to implement mmWave communication for vehicles. One of the key challenges in successfully implementing vehicular mmWave communication is proper beamforming. Beamforming is the process of using an array of antenna elements to broadcast a directional beam patterns that have a specific direction. Beamforming is a required step for any mmWave communication, but it is difficult to implement in vehicles because the endpoints are dynamic and traveling at roadway speeds, such as 15 miles per hour or greater.

In order to perform successful beamforming between the vehicles, changes in the network topology must be tracked. This is difficult due to the dynamic nature of the vehicles and the relatively fast speeds at which the vehicles are traveling. In addition, when new links are established, these newly established links frequently interfere with existing links. This causes a loss of signal due to the interference, which results in loss of signal.

SUMMARY

Described herein is a method for establishing millimeter wave (mmWave) vehicle-to-vehicle communications for data sharing. The method includes receiving, at an ego vehicle, a first beacon from a first vehicle, wherein the first beacon includes first scheduling information and first localization information and the first beacon is broadcast as a mmWave communication. The method includes determining a schedule based on the first scheduling information. The method includes broadcasting a second beacon based on the schedule. The method includes establishing a current link between the ego vehicle and the first vehicle. The method includes transmitting data to the first vehicle using the current link based on the schedule.

In some embodiments, the first localization information is a first position of the first vehicle and first speed of the first vehicle. In some embodiments, the second beacon includes that includes second scheduling information and second localization information and further comprising: generating a data structure that includes the first scheduling information, the first localization information, the second scheduling information, and the second localization information. In some embodiments, the method further includes: responsive to receiving the first beacon, determining whether a new link will interfere with the current link and responsive to the new link not interfering with the current link, establishing the new link. In some embodiments, determining whether the new link will interfere with the current link is based on the first scheduling information and the first localization information to avoid interference between the current link and the new link. In some embodiments, the ego vehicle uses a slot index to determine an available slot and further comprising: transmitting a link request before establishing the current link with the first vehicle. In some embodiments, the ego vehicle receives the first beacon quasi-omnidirectionally and the ego vehicle broadcasts the second beacon omnidirectionally.

A system can comprise an onboard vehicle computer system of an ego vehicle that includes a non-transitory memory storing computer code which, when executed by the onboard vehicle computer system causes the onboard vehicle computer system to: receive a first beacon from a first vehicle, wherein the first beacon includes first scheduling information and first localization information and the first beacon is broadcast as a mmWave communication, determine a schedule based on the first scheduling information, broadcast a second beacon based on the schedule, establish a current link between the ego vehicle and the first vehicle, and transmit data to the first vehicle using the current link based on the schedule.

In some embodiments, the first localization information is a first position of the first vehicle and first speed of the first vehicle. In some embodiments, wherein the second beacon includes that includes second scheduling information and second localization information and the computer code further causes the onboard vehicle computer system to: generate a data structure that includes the first scheduling information, the first localization information, the second scheduling information, and the second localization information. In some embodiments, wherein the computer code further causes the onboard vehicle computer system to: responsive to receiving the first beacon, determine whether a new link will interfere with the current link and responsive to the new link not interfering with the current link, establish the new link. In some embodiments, determining whether the new link will interfere with the current link is based on the first scheduling information and the first localization information to avoid interference between the current link and the new link. In some embodiments, the ego vehicle uses a slot index to determine an available slot and the computer code further causes the onboard vehicle computer system to: transmit a link request before establishing the current link with the first vehicle. In some embodiments, the ego vehicle receives the first beacon quasi-omnidirectionally and the ego vehicle broadcasts the second beacon omni-directionally.

One general aspect includes a non-transitory memory encoded with a computer program, the computer program comprising instructions that, when executed by one or more processors, cause the one or more processors to perform operations comprising receiving, at an ego vehicle, a first beacon from a first vehicle, wherein the first beacon includes first scheduling information and first localization information and the first beacon is broadcast as a mmWave communication, determine a schedule based on the first scheduling information, broadcasting a second beacon based on the schedule, establishing a current link between the ego vehicle and the first vehicle, and transmitting data to the first vehicle using the current link based on the schedule.

In some embodiments, the first localization information is a first position of the first vehicle and first speed of the first vehicle. In some embodiments, the second beacon includes that includes second scheduling information and second localization information and further comprising additional instructions stored on the non-transitory memory which, when executed by the one or more processors causes the one or more processors to execute additional operations comprising: generating a data structure that includes the first scheduling information, the first localization information, the second scheduling information, and the second localization information. In some embodiments, further comprising additional instructions stored on the non-transitory memory which, when executed by the one or more processors causes the one or more processors to execute additional operations comprising: responsive to receiving the first beacon, determining whether a new link will interfere with the current link and responsive to the new link not interfering with the current link, establishing the new link. In some embodiments, determining whether the new link will interfere with the current link is based on the first scheduling information and the first localization information to avoid interference between the current link and the new link. In some embodiments, the ego vehicle uses a slot index to determine an available slot and further comprising additional instructions stored on the non-transitory memory which, when executed by the one or more processors causes the one or more processors to execute additional operations comprising: transmitting a link request before establishing the current link with the first vehicle.

The specification describes a communication management system that solves the problem of establishing mmWave communications between vehicles. The specification also describes the following advantages and improvements which are not present in existing solutions: (1) high data rate communication links for vehicle-to-vehicle communications; (2) a greater number of communication links for more reliable transmission; and (3) spatial reuse that decreases communication latency by increasing transmission opportunities. The communication management system may be particularly advantageous for vehicles that use onboard radar systems, vehicles that include ADAS systems, and vehicles that communicate using Dedicated Short Range Communication (DSRC) messages or basic safety messages (BSMs).

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Example Overview

In some embodiments, an ego vehicle receives a first beacon from a first vehicle, where the first beacon includes scheduling information and localization information and the first beacon is broadcast as a millimeter wave (mmWave) communication. The scheduling information may describe data slots and timing associated with the data slots so that the ego vehicle and the first vehicle can schedule the transmission of data without interfering with other communications. The localization information may include the position and speed of the first vehicle. The ego vehicle may use the localization information to generate a data structure, such as a neighbor table, to keep track of changes in the network topology.

The ego vehicle may determine a schedule based on the scheduling information. For example, where the data slots are assigned on a first come, first serve basis, the ego vehicle may be assigned the second data slot described by the first beacon. The ego vehicle may broadcast a second beacon based on the schedule. For example, the second beacon may include second scheduling information that describes that the ego vehicle has reserved the second data slot.

The ego vehicle may establish a current link between the ego vehicle and the first vehicle. For example, the ego vehicle may use the localization information to determine the location of the first vehicle and perform beamforming to establish the current link. The ego vehicle may transmit data to the first vehicle using the current link based on the schedule. For example, the ego vehicle may transmit sensor data during the second data slot.

Example System

Figure 1:
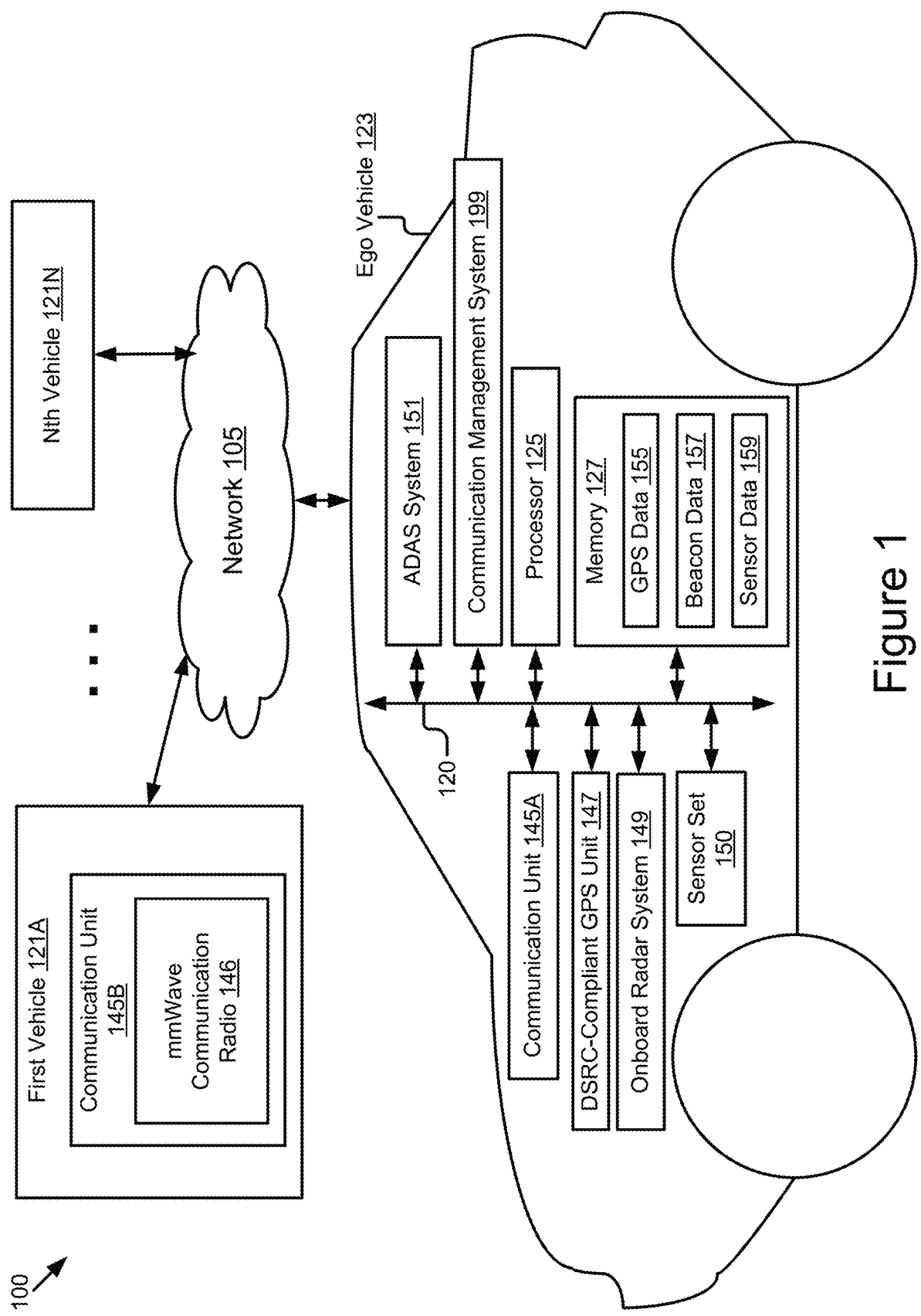
FIG. 1 is a block diagram illustrating an operating environment for a communication management system according to some embodiments.

Referring to FIG. 1, is an operating environment 100 for a communication management system 199 according to some embodiments. As depicted, the operating environment 100 includes the following elements: an ego vehicle 123, a first vehicle 121A, and an nth vehicle 121N. These elements are communicatively coupled to one another by a network 105.

In FIG. 1 and the remaining figures, a letter after a reference number, e.g., "121A," represents a reference to the element having that particular reference number. A reference number in the text without a following letter, e.g., "121,"

represents a general reference to embodiments of the element bearing that reference number.

Although one ego vehicle 123, one first vehicle 121A, one nth vehicle 121N, and one network 105 are depicted in FIG. 1, in practice the operating environment 100 may include one or more ego vehicles 123, one or more first vehicle 121A, one or more nth vehicle 121N, and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

The ego vehicle 123, the first vehicle 121A, and the nth vehicle 121N each include a mmWave communication radio that is capable of sending and receiving mmWave communications. One or more of the ego vehicle 123, the first vehicle 121A, and the nth vehicle 121N include an onboard radar system.

In some embodiments, one or more of the ego vehicle 123, the first vehicle 121A, and the nth vehicle 121N include a DSRC radio. The network 105 may include a DSRC communication channel shared among the ego vehicle 123, the first vehicle 121A, and the nth vehicle 121N. In some embodiments, the ego vehicle 123, the first vehicle 121A, and the nth vehicle 121N communicate using BSMs.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States and Europe, DSRC messages are transmitted at 5.9 GHz. In the United States, DSRC messages are allocated 75 MHz of spectrum in the 5.9 GHz band. In Europe, DSRC messages are allocated 30 MHz of spectrum in the 5.9 GHz band. In Japan, DSRC messages are transmitted in the 760 MHz band with 10 MHz of spectrum.

A wireless message, therefore, is not a DSRC message unless it operates in the 5.9 GHz band in the United States and Europe or the 760 MHz band in Japan. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz.

In some embodiments, a DSRC-enabled vehicle does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a vehicle lane is generally about 3.7 meters wide, and an accuracy of plus or minus 1.5 meters is sufficient to identify which lane a vehicle is travelling in among other vehicle lanes. In some embodiments, a DSRC-compliant GPS unit is operable to identify, monitor and track its two-dimensional position within 1.5 meters of its actual position 68% of the time under an open sky.

The DSRC messages are communicated using a vehicular-adapted wireless messaging protocol. One type of DSRC message is known as a Basic Safety Message ("BSM" if singular or "BSMs" if plural). The BSM may be broadcast at a bandwidth between 5.850 and 5.925 gigahertz. The transmission range of the BSM may be as large as 1,000 meters. DSRC-enabled vehicles broadcast a BSM at a regular interval, which is referred to below as a "time frame." In some embodiments, a communication management system is programmed with a default time frame value, for example, 0.01 seconds. The time frame may be user adjustable. In some embodiments, the BSM is broadcast at an adjustable rate of once every 0.10 seconds.

A BSM includes BSM data. The BSM data describes attributes of the vehicle. For example, the BSM may include two parts. Part 1 contains core data elements and is transmitted at an adjustable rate of about 10 times per second. Part 1 of the BSM data may describe one or more of the following: (1) GPS data describing a position of the vehicle; (2) motion data for the vehicle; and (3) a path history of the vehicle. The position of the vehicle may include latitude, longitude, elevation, positional accuracy, and a time associated with the position. The motion of the vehicle may include a transmission state, a speed of the vehicle, a heading of the vehicle, a steering wheel angle of the vehicle, a four-way acceleration set for the vehicle that includes three axes of acceleration plus yaw rate, and a brake system status. In some embodiments, part 1 may also include vehicle size.

Part 2 of the BSM data may include a variable set of data elements drawn from a list of optional elements. The list of optional elements may include a path history, a path prediction, information about hard active braking, information about a traction control system when it is active over 100 msec, information about an antilock brake system when it is active over 100 msec, a status of lights that are changed, a status of exterior lights, information about a change of the wipers, a status of the wipers, and vehicle type. Some of the BSM data included in Part 2 of the BSM are selected based on event triggers, e.g., anti-locking brake system ("ABS") being activated may trigger BSM data relevant to the ABS system of the vehicle. In some embodiments, the selected data elements are added to part 1 and sent as part of the BSM, but are transmitted less frequently in order to conserve bandwidth. In some embodiments, part 2 also includes current snapshots, with the exception of path data, which is itself limited to a few seconds worth of past history data.

In some embodiments, one or more of the ego vehicle 123, the first vehicle 121A, and the nth vehicle 121N is an autonomous vehicle or a semi-autonomous vehicle. For example, the ego vehicle 123 includes a set of Advanced Driver Assistance Systems (a set of "ADAS systems") that provide autonomous features to the ego vehicle 123 that are sufficient to render the ego vehicle 123 an autonomous vehicle.

The National Highway Traffic Safety Administration ("NHTSA") has defined different "levels" of autonomous vehicles, e.g., Level 0, Level 1, Level 2, Level 3, Level 4, and Level 5. If an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower-level number. The different levels of autonomous vehicles are described briefly below.

Level 0: The set of ADAS systems installed in a vehicle have no vehicle control, but may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems installed in the autonomous vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems installed in the autonomous vehicle fail to respond properly (based on the driver's subjective judgement). The set of ADAS systems installed in the autonomous vehicle executes accelerating, braking, and steering. The set of ADAS systems installed in the autonomous vehicle can deactivate immediately upon takeover by the driver.

Level 3: Within known, limited environments (such as freeways), the driver can safely turn their attention away from driving tasks, but must still be prepared to take control of the autonomous vehicle when needed. A highly autonomous vehicle ("HAV") is an autonomous vehicle that is Level 3 or higher.

Level 4: The set of ADAS systems installed in the autonomous vehicle can control the autonomous vehicle in all but a few environments such as severe weather. The driver must enable the automated system (which is comprised of the set of ADAS systems installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

Accordingly, in some embodiments one or more of the ego vehicle 123, the first vehicle 121A, and the nth vehicle 121N is one of the following: a Level 1 autonomous vehicle; a Level 2 autonomous vehicle; a Level 3 autonomous vehicle; a Level 4 autonomous vehicle; a Level 5 autonomous vehicle; and an HAV.

The ego vehicle 123 is any type of vehicle with an onboard vehicle computer capable of performing mmWave communications. Although the ego vehicle 123 in FIG. 1 is not illustrated as including a mmWave communication radio, the mmWave communication radio is illustrated and described in greater detail below with reference to FIG. 2. The ego vehicle 123 may be one of the following types of vehicles: a car; a truck; a sports utility vehicle; a bus; a semi-truck; a drone; or any other roadway-based conveyance.

In some embodiments, the ego vehicle 123 includes the following elements: a processor 125; a memory 127; a communication unit 145; a DSRC-compliant GPS unit 147; an onboard radar system 149; a sensor set 150; an ADAS system 151; and the communication management system 199. Each of the elements communicate via a bus 120.

In some embodiments, the processor 125 and the memory 127 may be elements of the onboard vehicle computer system (such as the computer system 200 described below with reference to FIG. 2). The onboard vehicle computer system may be operable to cause or control the operation of the communication management system 199. The onboard vehicle computer system may be operable to access and execute the data stored on the memory 127 to provide the functionality described herein for the communication management system 199 or its elements (see, e.g., FIG. 2). The onboard vehicle computer system may be operable to execute the communication management system 199, which causes the onboard vehicle computer system to execute one or more of the steps of the methods 1000, 1100, 1200, 1300, or 1400 described below with reference to FIG. 10, 11, 12, 13, or 14, respectively.

In some embodiments, the processor 125 and the memory 127 may be elements of an onboard unit. The onboard unit includes an electronic control unit (herein "ECU") or an onboard vehicle computer system that may be operable to cause or control the operation of the communication management system 199. The onboard unit may be operable to access and execute the data stored on the memory 127 to provide the functionality described herein for the communication management system 199 or its elements. The onboard unit may be operable to execute the communication management system 199 which causes the onboard unit to execute one or more of the steps of the method 700 described below with reference to FIG. 7. In some embodiments, the computer system 200 depicted in FIG. 2 is an example of an onboard unit.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 may include one or more processors 125. Other processors, operating systems, sensors, displays, and physical configurations may be possible.

The memory 127 is a non-transitory memory that stores instructions or data that may accessed and executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random access memory (virtual RAM). The ego vehicle 123 may include one or more memories 127.

The memory 127 of the ego vehicle 123 stores one or more of the following types of digital data: GPS data 155; beacon data 157; and sensor data 159. In some embodiments, the memory 127 stores any data that is necessary for the communication management system 199 to provide its functionality.

The GPS data 155 is digital data that describes a geographic location of an object. In some embodiments, the GPS data 155 describes the geographic location of the object with lane-level precision. The GPS data 155 may be generated by the DSRC-compliant GPS unit 147.

In some embodiments, the memory 127 stores one or more instances of the GPS data 155. For example, the memory 127 stores: a first instance of GPS data 155 that describes the geographic location of the ego vehicle 123 and a second instance of GPS data 155 that describes a geographic location of the DSRC-equipped electronic device that transmitted a BSM message. The first instance of GPS data 155 is retrieved by the DSRC-compliant GPS unit 147 of the ego vehicle 123. The second instance of GPS data 155 is retrieved by a DSRC-compliant GPS unit of the DSRC-equipped electronic device that broadcasted the BSM message.

In some embodiments, the GPS data 155 includes time data. Each transmission between the DSRC-compliant GPS unit 147 and the GPS satellite may include time data that describes the time as understood by a GPS satellite. The ego vehicle 123 may synchronize its onboard computer time with the first vehicle 121A and the nth vehicle 121N based on the time data received from the DSRC-compliant GPS unit 147. The communication management system 199 of the ego vehicle 123, the first vehicle 121A, and the nth vehicle 121N use the time data to synchronize the time in order to generate the same time frames for use with the beacons and the schedule information.

The beacon data 157 is digital data that describes information derived from beacons and/or information used to generate beacons. A beacon may include scheduling information and localization information associated with a vehicle. The scheduling information may describe the schedule for sending out data as arranged in slots. The scheduling information may also include a slot index, such as an address representative of a time slot and a slot descriptor table that contains one or more slot descriptors, where the slot descriptors describe different types of actions that may be performed within the time slot. The localization information may include a position and speed of a corresponding vehicle. In some embodiments, the localization information may be derived from the GPS data 155. In some embodiments, the beacon data 157 may include information based on the sensor data 159.

The sensor data 159 is digital data that describes data generated by a sensor set 150 of the ego vehicle 123, the first vehicle 121A, or the nth vehicle 121N. For example, the sensor data 159 may include images from external cameras and internal cameras, lidar measurements, radar measurements, measurements from advanced driver assistance systems (ADAS), etc. The sensor data 159 may describe the surrounding of the ego vehicle 123, which may be used to create a map of the objects surrounding the vehicles.

The communication unit 145A transmits and receives data to and from the network 105 or to another communication channel. In some embodiments, the communication unit 145A may include a DSRC radio, a mmWave communication radio, and other hardware or software necessary to make the ego vehicle 123 equipped to transmit and receive mmWave communications.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods, including: IEEE 802.11; IEEE 802.16, Bluetooth®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145A includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the DSRC-compliant GPS unit 147 includes any hardware and software necessary to make the ego vehicle 123 or the DSRC-compliant GPS unit 147 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

In some embodiments, the DSRC-compliant GPS unit 147 is operable to provide GPS data 155 describing the location of the ego vehicle 123 with lane-level accuracy. For example, the ego vehicle 123 is driving on a four-lane highway. Lane-level accuracy means that the location of the ego vehicle 123 is described by the GPS data 155 so accurately that the ego vehicle's 123 position in the third of the four lanes may be accurately determined based on the GPS data 155 for this ego vehicle 123 as provided by the DSRC-compliant GPS unit 147.

In some embodiments, the DSRC-compliant GPS unit 147 includes hardware that wirelessly communicates with a GPS satellite to retrieve GPS data 155 that describes the geographic location of the ego vehicle 123 with a precision that is compliant with the DSRC standard. The DSRC standard requires that GPS data 155 be precise enough to infer if two vehicles (one of which is, for example, the ego vehicle 123) are located in adjacent lanes. In some embodiments, the DSRC-compliant GPS unit 147 is operable to identify, monitor and track its two-dimensional position within 1.5 meters of its actual position 68% of the time under an open sky. Since traffic lanes are typically 3.7 meters wide, whenever the two-dimensional error of the GPS data 155 is less than 1.5 meters the communication management system 199 described herein may analyze the GPS data 155 provided by the DSRC-compliant GPS unit 147 and determine what lane the ego vehicle 123 is travelling in based on the relative positions of two or more travelling vehicles (one of which is, for example, the ego vehicle 123) in multiple lanes at the same time.

In some embodiments, the onboard radar system 149 includes any hardware and software necessary measure the physical environment outside of the ego vehicle 123. In some embodiments, the onboard radar system 149 is software that communicates with the sensor set 150 of one or more sensors described below. For example, the sensor set 150 may include one or more sensors that record one or more physical characteristics of the physical environment that is proximate to the ego vehicle 123. The memory 127 may store sensor data 159 that describes the one or more physical characteristics recorded by the sensor set 150. The sensor data 159 may be used by the communication management system 199 to confirm or deny the GPS data 155 or other data stored in the memory 127. For example, the GPS data 155 may indicate that the ego vehicle 123 is located near a particular landmark, and the sensor data 159 may include a digital image that includes the particular landmark, thereby confirming the accuracy of the GPS data 155.

The sensor set 150 may include one or more devices that provide sensor data 159 about a vehicle operation. For example, the sensor set 150 may include one or more sensors that detect a presence of objects that surround the vehicle 123. The sensor set 150 may be communicatively coupled to an onboard computer of a vehicle so that the sensor data 159 may be stored in the memory 127 and accessible by the beam alignment application 199.

The sensors included in the sensor set 150 may include one or more external sensors such as one or more of the following: a camera or camera array mounted to the exterior of the first vehicle 121, a microphone; a moisture sensor, a thermometer; an altimeter; an accelerometer; a WiFi sniffer; a Bluetooth antenna; a LIDAR camera; a humidistat; an infrared camera, etc.

The sensor set 150 may include an infrared detector, a motion detector, a thermostat, etc. Alternatively or additionally, the sensor set 150 may include a component or module of another system or device included in the first vehicle 121 (e.g., radio, infotainment system, air conditioner, windshield wipers, systems for repositioning vehicle occupant seats, systems for changing the level of vehicle windows, vehicle headlights, vehicle cabin lights, etc.) that reports a status of the system or device to the onboard computer of the first vehicle 121 where it may be monitored or controlled by other elements of the first vehicle 121.

Accordingly, the sensor set 150 may provide sensor data describing one or more of the following: a temperature inside the vehicle; a temperature outside the vehicle; a position of the seats; a radio station; an audio program; a window level; a level of illumination of vehicle headlights or cabin lights, a speed of windshield wipers, and other parameters or settings associated with the vehicle and/or any system, subsystem, or device included in or communicatively coupled to the vehicle.

In some implementations, the sensor set 150 may include sensors for measuring one or more of a current time, a location (e.g., a latitude, longitude, and altitude of a location), an acceleration of the ego vehicle 123, a velocity of the ego vehicle 123, a fuel tank level of the ego vehicle 123, a battery level of the ego vehicle 123, etc.

Figure 3A:
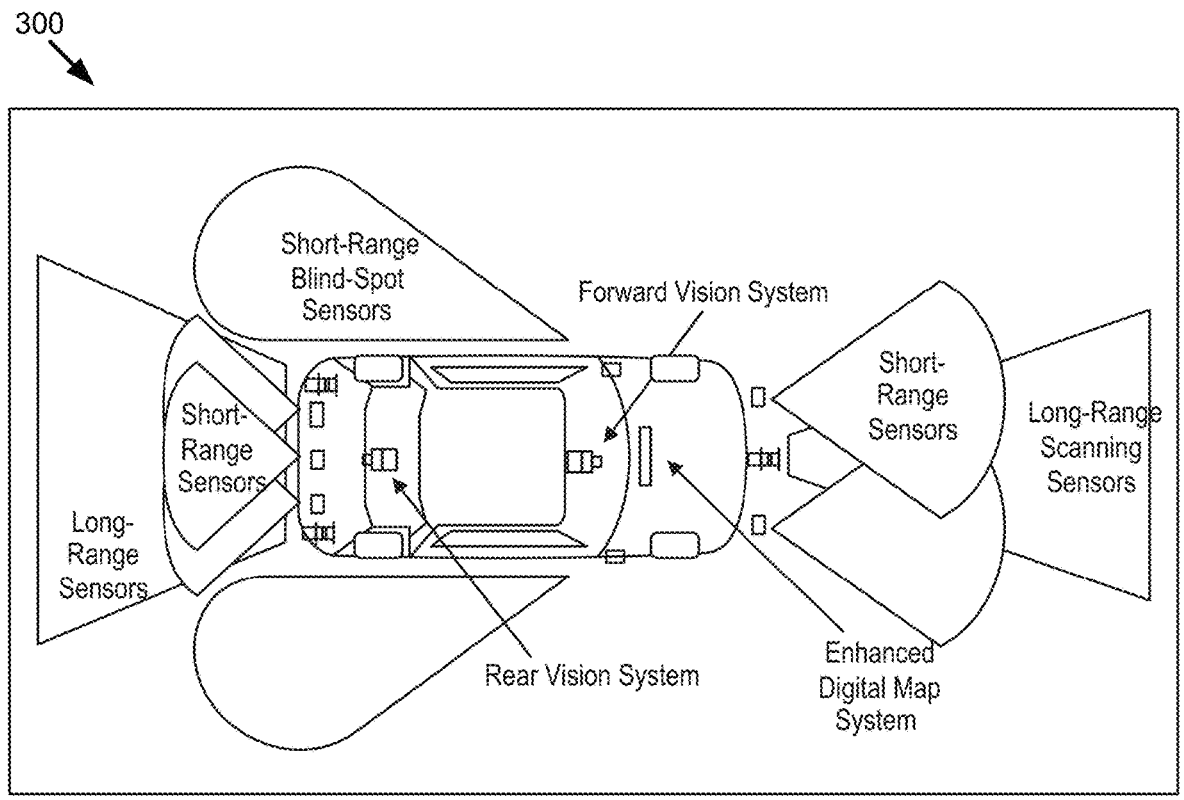
FIG. 3A is a block diagram illustrating an example sensor set used by the onboard radar system of FIG. 1 according to some embodiments.

The sensor set 150 may include short-range sensors, long-range sensors, and other sensors that are described in greater detail below with reference to FIG. 3A. In some embodiments, the sensor set of the ego vehicle 123 may include one or more of the following vehicle sensors: a camera; a LIDAR sensor; an ultrasonic sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The radar-dependent ADAS system 151 includes software and hardware for assisting drivers. The radar-dependent ADAS system 151 includes one or more ADAS systems. Examples of ADAS systems included in the radar-dependent ADAS system 151 include one or more of the following elements of the HAV: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system. Each of these example ADAS systems provide their own features and functionality that may be referred to herein as a "ADAS feature" or an "ADAS functionality," respectively. The features and functionality provided by these example ADAS systems are also referred to herein as an "autonomous feature" or an "autonomous functionality," respectively. The autonomous features and autonomous functionality provided by the ADAS systems of the radar-dependent ADAS system 151 are sufficient to classify the vehicle which includes the optimization system 199 as an HAV. Specific examples of different ADAS systems are discussed below with reference to FIG. 3B.

In some embodiments, the communication management system 199 includes code and routines that are operable, when executed by the processor 125, to cause the processor 125 to execute one or more of the steps of any of the methods 1000, 1100, 1200, 1300, or 1400 described below with reference to FIG. 10, 11, 12, 13, or 14, respectively.

In some embodiments, the communication management system 199 of the ego vehicle 123 may be implemented using hardware including a field-programmable gate array ("FPGA") or an application-specific integrated circuit ("ASIC"). In some other embodiments, the communication management system 199 may be implemented using a combination of hardware and software.

The first vehicle 121A may include a communication unit 145B. Because the communication unit 145 is substantially similar to the communication unit 145A described above with reference to the ego vehicle 123, the description will not be repeated here. The communication unit 145B may include one or more mmWave communication radios 147.

The mmWave communication radio 146 includes a transceiver for transmitting a mmWave communication and a receiver for receiving a mmWave communication. The mmWave communication transceiver transmits mmWave messages to the network 105, which is received by the ego vehicle 123. The mmWave communication receiver receives mmWave messages from the ego vehicle 123 via the network 105. In this way, the first vehicle 121 and the ego vehicle 123 transmit mmWave messages to one another. In some embodiments, the mmWave communication radio 146 includes transceivers and receivers on the front and rear bumpers and sides for communication with the ego vehicle 123 and other vehicles, and a transceiver and a receiver on the rooftop for communication with infrastructure.

Example Computer System

Figure 2:
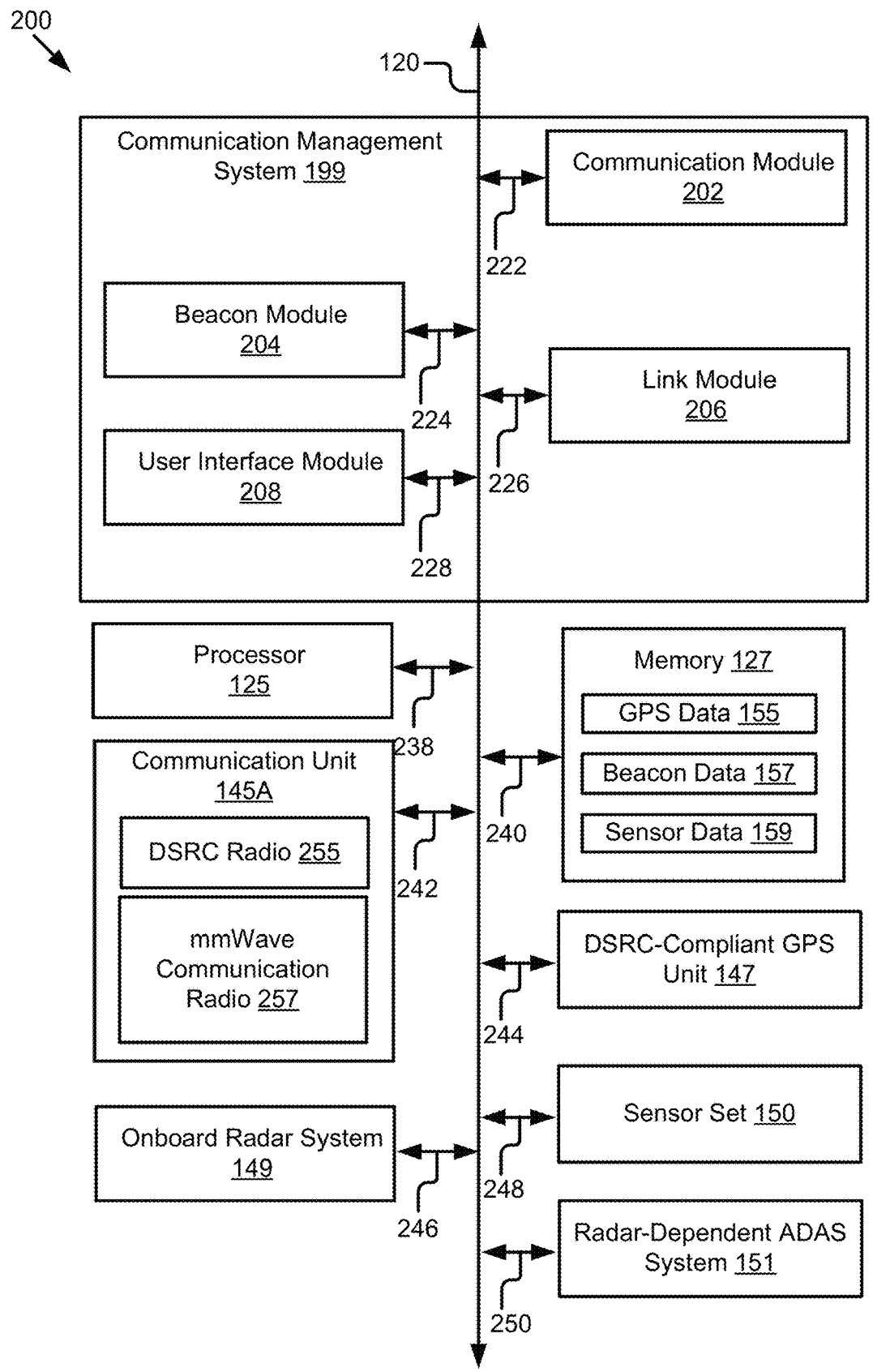
FIG. 2 is a block diagram illustrating an example computer system that includes a communication management system according to some embodiments.

Referring now to FIG. 2, depicted is a block diagram illustrating an example computer system 200 including the communication management system 199 of the ego vehicle 123 of FIG. 1 according to some embodiments.

In some embodiments, the computer system 200 may include a special-purpose computer system that is programmed to perform one or more steps of the methods 1000, 1100, 1200, 1300, or 1400 described below with reference to FIG. 10, 11, 12, 13, or 14, respectively.

In some embodiments, the computer system 200 is an onboard vehicle computer of the ego vehicle 123. In some embodiments, the computer system 200 is an onboard unit of the ego vehicle 123 of FIG. 1. In some embodiments, the computer system 200 is an ECU, head unit or some other processor-based computing device of the ego vehicle 123 of FIG. 1.

The computer system 200 may include one or more of the following elements according to some examples: the communication management system 199; the processor 125; the memory 127; the communication unit 145; the DSRC-compliant GPS unit 147; the onboard radar system 149; the sensor set 150; and the radar-dependent ADAS system 151. The components of the computer system 200 are communicatively coupled by a bus 120.

In the illustrated embodiment, the processor 125 is communicatively coupled to the bus 120 via signal line 238. The memory 127 is communicatively coupled to the bus 120 via signal line 240. The communication unit 145 is communicatively coupled to the bus 120 via signal line 242. The DSRC-compliant GPS unit 147 is communicatively coupled to the bus 120 via signal line 244. The onboard radar system 149 is communicatively coupled to the bus 120 via signal line 246. The sensor set 150 is communicatively coupled to the bus 120 via signal line 248. The radar-dependent ADAS system 151 is communicatively coupled to the bus 120 via signal line 250.

The following elements of the computer system 200 were described above with reference to FIG. 1, and so, those descriptions will not be repeated here: the processor 125; the memory 127; the communication unit 145; the DSRC-compliant GPS unit 147; the onboard radar system 149; the sensor set 150; and the radar-dependent ADAS system 151.

The memory 127 may store any of the data described above with reference to FIG. 1. The memory 127 may store any data needed for the computer system 200 to provide its functionality.

As illustrated, the memory 127 stores: the GPS data 155; the beacon data 157; and the sensor data 159. These elements were described above with reference to FIG. 1, and so, their descriptions will not be repeated here.

In some embodiments, the communication unit 145 includes a DSRC radio 255 and a mmWave communication radio 257. The mmWave communication radio 257 is similar to the mmWave communication radio 146 discussed above with reference to FIG. 1, and so, it will not be repeated here.

The DSRC radio 255 is a hardware unit that includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band.

In some embodiments, the DSRC radio 255 includes any hardware or software which is necessary to make the ego vehicle 123 compliant with the DSRC standards. In some embodiments, the DSRC-compliant GPS unit 147 is an element of the DSRC radio 255.

In some embodiments, the DSRC radio 255 includes a non-transitory memory which stores digital data that controls the frequency for broadcasting BSM messages. In some embodiments, the non-transitory memory stores a buffered version of the GPS data 155 for the ego vehicle 123 so that the GPS data 155 for the ego vehicle 123 is broadcast as an element of a BSM messages that is regularly broadcast by the DSRC radio 255.

The onboard radar system 149 includes any hardware and software necessary measure the physical environment outside of the ego vehicle 123 of FIG. 1. The onboard radar system 149 may include a sensor set of short-range sensors, long-range sensors, and other sensor systems. Turning to FIG. 3A, a block diagram is illustrated that depicts an example sensor set 300 that is used by the onboard radar system 149 of FIG. 1 according to some embodiments.

The example sensor set 300 performs environmental sensing using short-range sensors, long-range sensors, a rear vision system, a forward vision system, and an enhanced digital map system. The short-range sensors may be used to identify objects that are close to the ego vehicle 123, such as a trash can, a child, etc. The long-range sensors may be used to identify objects that are further away from the ego vehicle 123, such as the first vehicle 121A and the nth vehicle 121N. The rear vision system may include a camera and be used to perform object detection and may have high frequency infrared capabilities. The rear vision system may be particularly susceptible to radar interference because high frequency communications have higher energy, which causes greater radar interference. The forward vision system may include a camera and be used to perform lane tracking and object detection. The enhanced digital map system may collect data from the sensor set and transmit it to a map server in the cloud, which collects similar data from other vehicles and uses the data to generate an enhanced digital map. The map server may also receive location data from a GPS satellite.

Figure 3B:
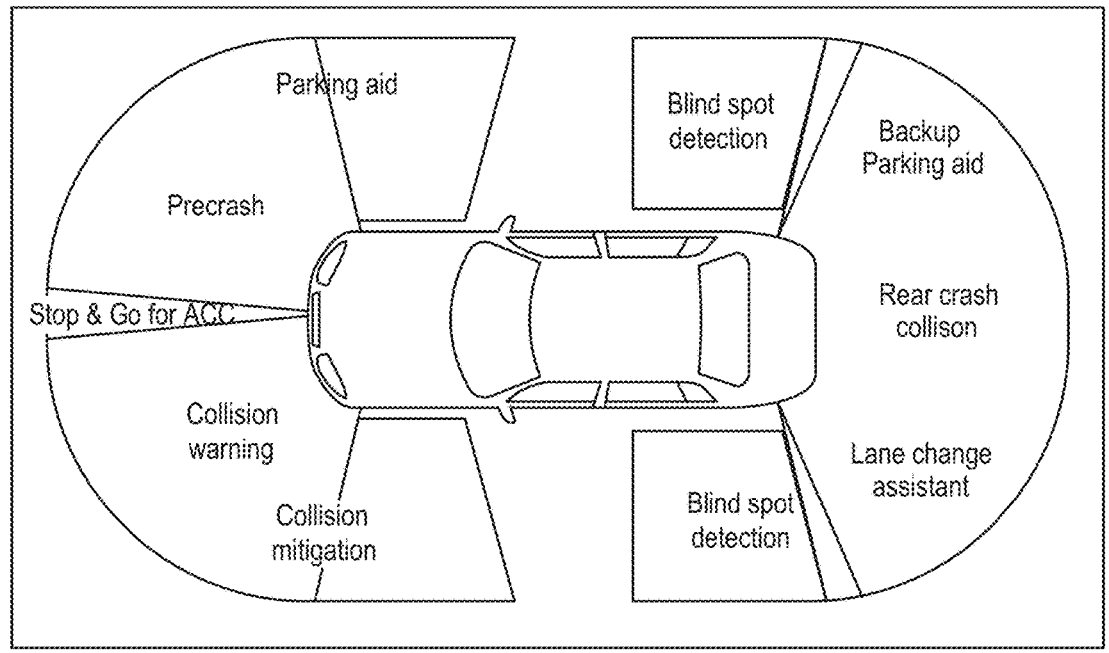
FIG. 3B is a block diagram illustrating example advanced driver assistance systems (ADAS systems) that are used by the radar-dependent ADAS system of FIG. 1 according to some embodiments.

The radar-dependent ADAS system 151 includes one or more ADAS systems that assist a driver in driving the vehicle. The ADAS systems rely heavily on the onboard radar system 149. A wide radar field-of-view is especially important for automated driving because radar-dependent ADAS system 151 needs to identify all objects that surround a vehicle. Turning now to FIG. 3B, a block diagram is depicted that illustrates examples ADAS systems 350 that are used by the radar-dependent ADAS system 151 of FIG. 1 according to some embodiments. In this example, the ADAS systems include blind spot detection, lane change assistance, rear crash collision avoidance, backup parking aid assistance, pre-crash assistance, stop and go for adaptive cruise control (ACC) assistance, collision warning assistance, and collision mitigation.

The different ADAS systems included in FIG. 3B help illustrate the level of complexity involved in a vehicle that is dependent on radar for using the different ADAS systems. Each of the sensors in the sensor set used by the onboard radar systems illustrated in FIG. 3A may use a different communication channel to function. When multiple vehicles are on a roadway at any given time and are clustered together while executing their respective onboard radar systems simultaneously, it results in radar interference because the different vehicles may be using the same communication channels.

The communication management system 199, as described in greater detail below, prevents radar interference from occurring by using radar parameters that the ego vehicle 123, the first vehicles 121A, and the nth vehicle 121N all use so that their respective radar-dependent ADAS systems can function without any radar interference caused by operating their respective onboard radar systems.

In the illustrated embodiment shown in FIG. 2, the communication management system 199 includes a communication module 202, a beacon module 204, a link module 206, and a user interface module 208.

The communication module 202 can be software including routines for handling communications between the communication management system 199 and other components of the computer system 200 or one or more of the operating environment 100 of FIG. 1. In some embodiments, the communication module 202 can be a set of instructions executable by the processor 125 to provide the functionality described below for handling communications between the communication management system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100. For example, the communication module 202 receives or transmits, via the communication unit 145, beacons from the first vehicle 121A and/or the nth vehicle 121N. The communication module 202 may send or receive any of the data described above with reference to FIG. 1, via the communication unit 145.

In some embodiments, the communication module 202 receives data from components of the communication management system 199 and stores the data in the memory 127 (or a buffer or cache of the memory 127). For example, the communication module 202 receives GPS data 155 from the DSRC-compliant GPS unit 147 and stores the GPS data 155 in the memory 127 (or a buffer or cache of the memory 127).

In some embodiments, the communication module 202 may handle communications between components of the communication management system 199. For example, the communication module 202 transmits beacon data 157 from the beacon module 204 to link module 206.

The beacon module 204 can be software including routines for identifying information from beacons and creating beacons. In some embodiments, the beacon module 204 can be a set of instructions executable by the processor 125 which, when executed by the processor 125, cause the processor 125 to execute one or more of the steps of the methods 1000, 1100, 1200, 1300, and 1400 described below with reference to FIGS. 10, 11, 12, 13, and 14, respectively. In some embodiments, the beacon module 204 can be stored in the memory 127 of the computer system 200 and can be accessible and executable by the processor 125. The beacon module 204 may be adapted for cooperation and communication with the processor 125 and other components of the computer system 200 via signal line 224.

The beacon module 204 listens, for a given time frame, for beacons that are being broadcasted. The beacons may be wireless messages, such as DSRCs or BSMs. The beacons may be received from the first vehicle 121A or the nth vehicle 121N. In some embodiments, the beacons may be received from a road-side unit or a base station. In some embodiments, the beacons are transmitted as mmWave communications or the beacons are broadcast using existing lower frequency systems.

Figure 4:
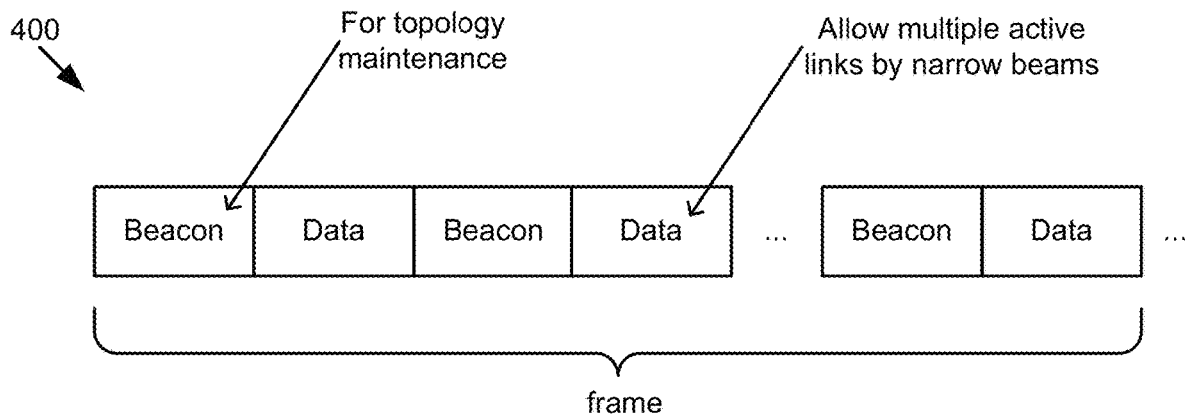
FIG. 4 is a block diagram illustrating an example frame that includes both a beacon and data according to some embodiments.

Turning to FIG. 4, a block diagram 400 of an example frame is illustrated that includes both a beacon and data according to some embodiments. Beacons may be broadcast in different ways including a time division multiple access (TDMA)-based approach, a frequency division multiple access (FDMA), a code division multiple access (CDMA), an orthogonal frequency division multiple access (OFDMA), or any combination of the different approaches that include TDMA. In the example in FIG. 4, a TDMA-based approach is used.

TDMA allows multiple vehicles to communicate with each other using the same communication channel by dividing time into slots when each vehicle agrees to share data. For example, the vehicles may communicate using radio frequencies in the electromagnetic spectrum from about 28 to 300 gigahertz ("GHz"). Radio waves in this band have wavelengths from ten to one millimeter, and are consequently referred to as mmWaves. mmWave communications are advantageous because a huge spectrum is available at the mmWave band and mmWave communications support large exchanges of data, such as when sensor data 159 is shared between vehicles. This is particularly advantages for ADAS systems because they rely on sensor data to implement various autonomous functions.

When the beacons are broadcast via TDMA, a data stream is divided into frames and each frame is divided into beacons and data.

A beacon may be a packet that is broadcast with some regularity. For example, a beacon may be broadcast every 100 ms. The beacons may include network topology data, scheduling information, and localization information. The network topology data may include information about the different links between vehicles in the network 105. The localization information may include the position and speed of the vehicle that broadcast the beacon. The scheduling information may include the current scheduling of the beacon broadcasting node by providing quantified beam direction in its associated data transmission.

The data may include high data rate sensor data or any other data. In some embodiments, the data may be transferred using narrow beams. As a result, multiple links may be established for transferring data using the narrow beams.

Figure 5:
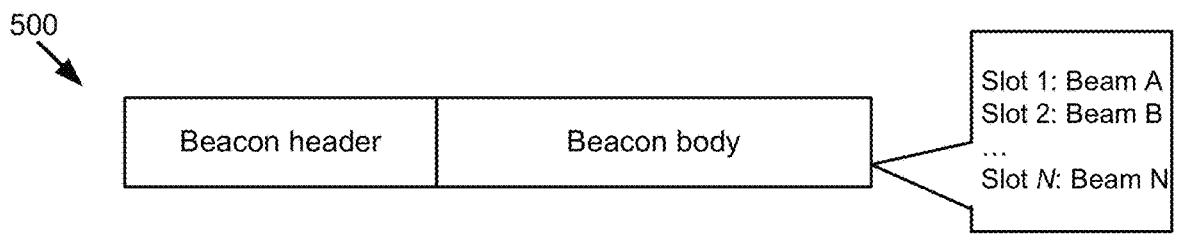
FIG. 5 is a block diagram illustrating an example beacon according to some embodiments.

Turning to FIG. 5, a block diagram 500 illustrates an example beacon according to some embodiments. A beacon may be divided into a beacon header and a beacon body. The beacon header may include the localization information and the beacon body may include the scheduling information.

The localization information may be used by the vehicles 121, 123 to generate a data structure, such as a neighbor table that describes the network topology. For example, a data structure such as a neighbor table includes first scheduling information and first localization information associated with a first vehicle 121A, and second scheduling information and second localization information associated with the ego vehicle 123. The beacon module 204 may update the neighbor table based on received beacons to update the network topology described by the neighbor table. For example, if a beacon describes a different network topology than is described by the neighbor table, the beacon module 204 updates the neighbor table to reflect the new network topology. The vehicles 121, 123 may use the data structure to configure beamforming because the data structure describes the position and speed of the different vehicles, which is necessary for the ego vehicle 123 to establish a link with, for example, the first vehicle 121A.

The scheduling information may include slots assigned to different vehicles. For example, slot 1 may be associated with beam A, which is assigned to the ego vehicle 123; slot 2 may be associated with beam B, which is assigned to the first vehicle 121A; and slot N may be associated with beam N, which is assigned to the nth vehicle 121N. In some embodiments, the slots may be assigned according to a protocol shared by all the vehicles 121, 123. For example, if an ego vehicle 123 sends the first beacon, it is assigned the first slot; if the first vehicle 121A sends the second beacon it is assigned the second slot, etc.

The scheduling information may also include a slot index, such as an address representative of a time slot and a slot descriptor table that contains one or more slot descriptors, where the slot descriptors describe different types of actions that may be performed within the time slot. The beacon module 204 may determine whether it is the ego vehicle's 123 turn to transmit data based on the time of the time slot for the ego vehicle 123 occurring. For example, the beacon module 204 may determine based on a timeout that it is time to transmit the data.

In some embodiments, the ego vehicle 123 and the other vehicles 121 determine when to broadcast beacons based on being synchronized with each other using GPS data 155. For example, the beacon module 204 receives GPS data 155 from a GPS satellite. The beacon module 204 extracts time data from the GPS data 155 that describes the time as understood by the GPS satellite. The beacon module 204 establishes a default time frame value (e.g., 0.01 seconds). The default time frame value may be pre-programmed, modified by a user, etc. The beacon module 204 synchronizes its onboard computer time with the first vehicle 121A and the nth vehicle 121N based on the time data that is part of the GPS data 155 received from the GPS satellite.

Figure 6:
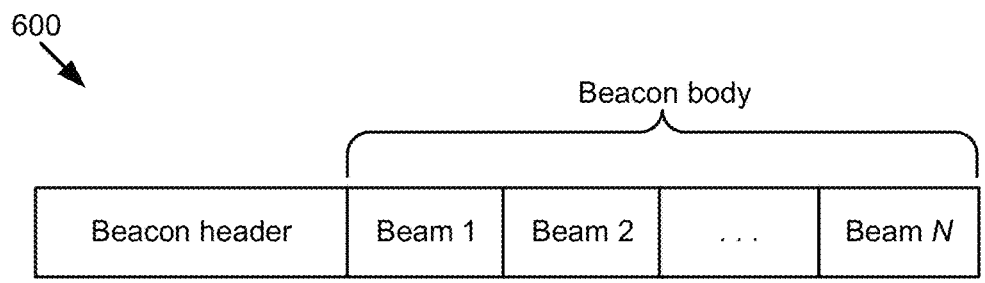
FIG. 6 is a block diagram illustrating another example beacon according to some embodiments.

FIG. 6 is a block diagram 600 illustrating another example beacon according to some embodiments. In this example, the beacon is divided into the beacon header and the beacon body. The beacon header includes a node position and beacon reservation information. The node represents any vehicle that transmits or receives data. The beacon body is divided into time slots as indicated by Beam 1, Beam 2, . . . Beam N.

In some embodiments, the beacon module 204 determines a schedule based on scheduling information included in a beacon. For example, the beacon module 204 may receive a first beacon from a first vehicle 121A, identify first scheduling information from the first beacon, and determine a schedule based on the first scheduling information. The beacon module 204 may broadcast a second beacon based on the schedule where the second beacon includes second scheduling information and second localization information. The beacon module 204 may broadcast the second beacon by instructing the mmWave communication radio 257, via the communication module 202, to broadcast the second beacon as a mmWave communication.

The link module 206 can be software including routines for generating links. In some embodiments, the link module 206 can be stored in the memory 127 of the computer system 200 and can be accessible and executable by the processor 125. The link module 206 may be adapted for cooperation and communication with the processor 125 and other components of the computer system 200 via signal line 226.

The link module 206 may establish a current link between the ego vehicle 123 and the first vehicle 121A based on the localization information. In some embodiments, the link module 206 determines beamforming information based on the data structure, such as the neighbor table generated by the beacon module 204. As a result, the link module 206 may configure beamforming based on changes in the network topology as reflected by the neighbor table.

The link module 206 may instruct the communication unit 145A to transmit data based on the schedule. For example, the schedule may describe the time slot when the ego vehicle 123 can transmit data using the link established by the link module 206.

In some embodiments, the link module 206 establishes a new link by determining the location of one or more current links and determining whether the new link will interfere with the one or more current links. For example, the ego vehicle 123 may establish a current link with the first vehicle 121A. The link module 206 may determine whether a new link established with an nth vehicle 121N will interfere with the current link. The link module 206 may determine whether the new link interferes with one or more current links based on localization information included in a beacon. For example, the link module 206 may identify the location of one or more current links as described in a neighbor table. If a new link may be established without interfering with the one or more current links, the link module 206 may establish the new link.

Figure 7A:
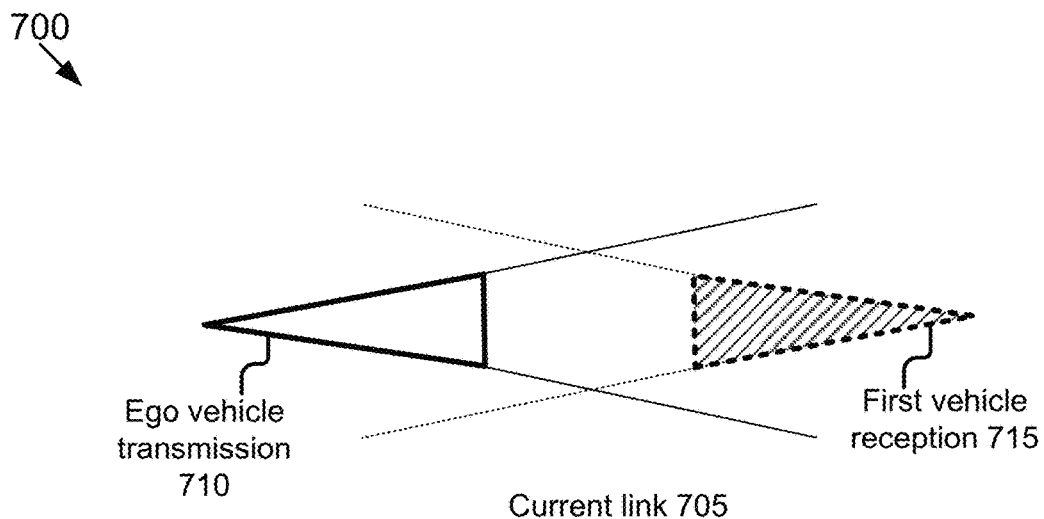
FIG. 7A is a block diagram illustrating an example current link according to some embodiments.
Figure 7A:
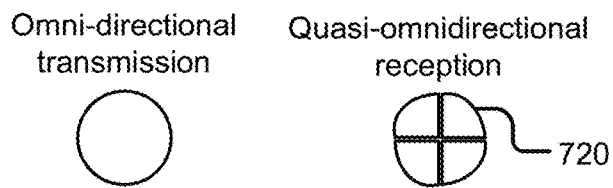

Turning to FIG. 7A, a block diagram 700 illustrates an example current link 705 according to some embodiments. The current link 705 is established by an ego vehicle transmission 710 from a transmitter associated with the ego vehicle and a first vehicle reception 715 from a receiver associated with the first vehicle. The receiver is illustrated with a striped pattern and the beam from the receiver is illustrated with dashed lines to distinguish it from the transmitter, which is illustrated with a solid line. In some embodiments, vehicles within close proximity to each other may establish multiple links using directional antennas. For example, an ego vehicle may establish the current link 705 and a new link. In another embodiment, the ego vehicle may establish the current link and a neighboring vehicle may establish a new link. This process is referred to as spatial reuse.

FIG. 7A also includes illustrations of different types of transmission and reception. Overhead and range are balanced by broadcasting beacons omni-directionally and receiving beams quasi-omnidirectionally. The transmission of data using a link may be omnidirectional, which means a transmitter of the ego vehicle 123 radiates wave power uniformly in all directions in one plane. The reception may be quasi-omnidirectional, which means that a receiver of the ego vehicle 123 receives a beam by sequentially switching between beams where each of the quarters 720 represents a beam. The reception is quasi-omnidirectional because the receiver does not know the transmitter. Once the link is established, transmissions and receptions are directional because the positions of the vehicles is known.

Figure 7B:
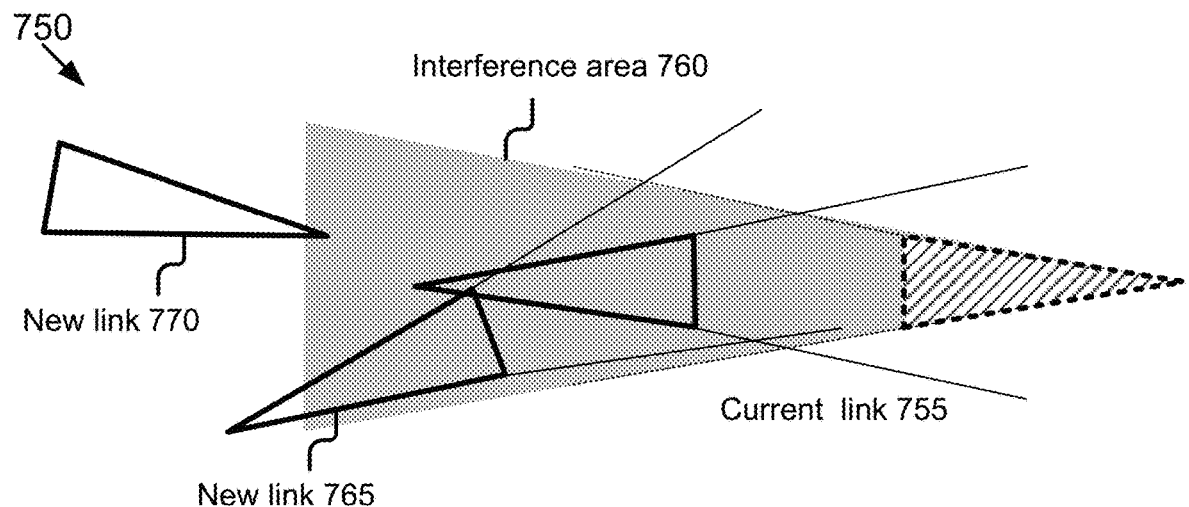
FIG. 7B is a block diagram illustrating an example interference area of a current link according to some embodiments.

FIG. 7B is a block diagram 750 illustrating an example interference area of a current link according to some embodiments. In this example, the receiver is illustrated with striped lines and the beam from the receiver is illustrated with dashed lines to distinguish it from the transmitters, which are illustrated with solid lines. As discussed above, spatial reuse occurs when vehicles establish multiple links within proximity of each other. When a current link 755 is established, it creates an interference area 760. When a transmitter is in the interference region, depending on the direction of the new link, it could cause head-on interference. Head-on interference occurs when the main beam direction (i.e., the beam emitted from the transmitter) is pointing directly at an existing receiver.

For example, in FIG. 7B the new link 765 causes head-on interference with the current link 755 because the new link 765 is pointing directly at the receiver for the current link 755. Conversely, new link 770 causes weak interference and not head-on interference because the new link 770 is not pointed at the receiver for the current link 755. As a result, new link 765 is a problematic link and new link 770 is a much better link to use to minimize interference and signal loss.

The link module 206 may use the localization information and the scheduling information to avoid establishing a new link that could cause interference. For example, the localization information may include geometrical information about the angle of existing links. The link module 206 may configure new links that are angled to avoid the angle of existing links. For example, the link module 206 may determine that current links have a distance of about two car lengths and the link module 206 may determine the interference area based on the angle of the existing links. The link module 206 may instruct the communication unit 145A to broadcast the new link according to the scheduling information to avoid head-on interference.

A new link is established based on use of the data slots referenced by a beacon. For example, referring to the frame illustrated in FIG. 4, data is transmitted during the data slots illustrated in the frame. The data lots include two phases: link establishment and data transmission/reception. The link module 206 instructs the communication unit 145A (e.g., the mmWave communication radio 257 that is part of the communication unit 145A) to transmit a link request. The link request is transmitted during a free data slot. Once the link request is granted, the new link is established. The new link is used repeatedly until the new link is torn down.

Figure 8:
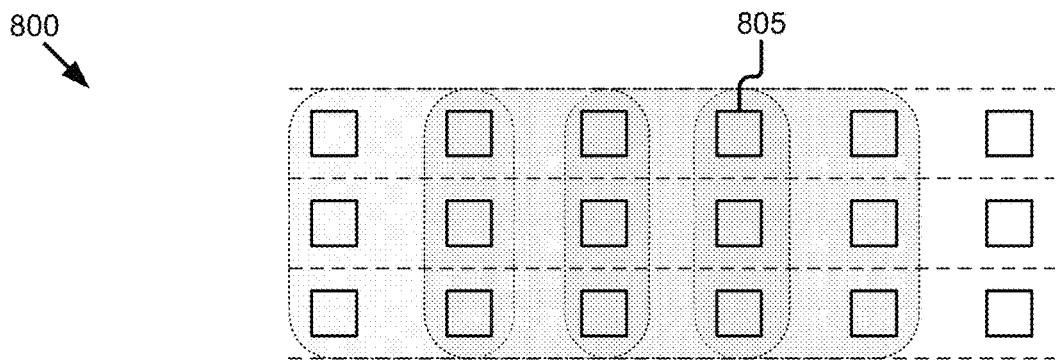
FIG. 8 is a block diagram illustrating an example beacon range of transmission between vehicles on a roadway according to some embodiments.

FIG. 8 is a block diagram 800 illustrating an example beacon range of transmission between vehicles on a roadway according to some embodiments. The link module 206 in a vehicle may determine the beacon range of other vehicles as being about two vehicles long. For example, the vehicle 805 may have to avoid interference from six surrounding vehicles when establishing a new link.

Figure 9:
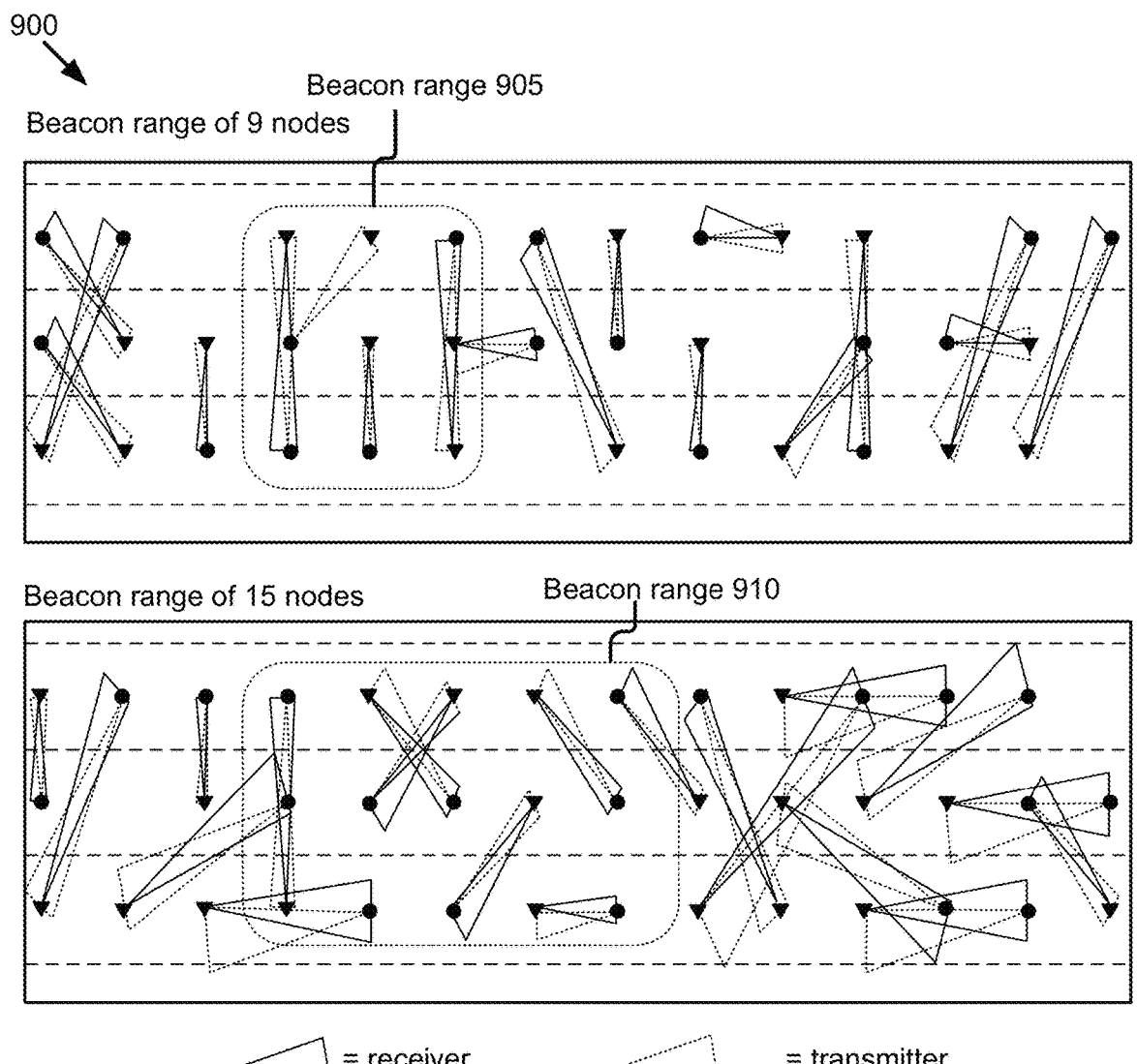
FIG. 9 is a block diagram illustrating example data slot allocations following a spatial reverse rule as a function of a number of nodes according to some embodiments.

FIG. 9 is a block diagram 900 illustrating example data slot allocations following a spatial reverse rule as a function of a number of nodes according to some embodiments. In this example, two different scenarios are analyzed: one where the beacon range includes nine nodes (i.e., nine vehicles) and one where the beacon range includes 15 nodes (i.e., 15 vehicles). The beacon range 905, 910 illustrates that it is possible to use links with a beam range of nine nodes and possibly even 15 nodes if the beam is narrow. In this example, a 10 degree beam range is used. For a three-lane road with 25 meters between the vehicles and a beacon region of nine vehicles, spatial reuse allows most nodes to be active during all the time slots where more than 90% of the links achieve a data rate of 50 Mbps or higher.

The user interface module 208 can be software including routines for generating graphical data for displaying a user interface. In some embodiments, the user interface module 208 can be stored in the memory 127 of the computer system 200 and can be accessible and executable by the processor 125. The user interface module 208 may be adapted for cooperation and communication with the processor 125 and other components of the computer system 200 via signal line 228.

In some embodiments, the user interface module 208 generates graphical data for displaying a user interface for a user, such as a driver of the ego vehicle 123. The user interface module 208 may generate graphical data for displaying a user interface that provides the user with options for configuring aspects of the communication management system 199. For example, the user interface module 208 may provide an option for the user to specify system parameters, such as a number of free beacon slots that are greater than the minimum number of candidates that are required before the communication management system 199 randomly selects beacon slots from the candidate list.

For example, the user interface may include an option for associating the communication management system 199 with mapping software so that the mapping software can provide the communication management system 199 with the driver's current journey data for travelling to a destination.

Example Methods

Figure 10A:
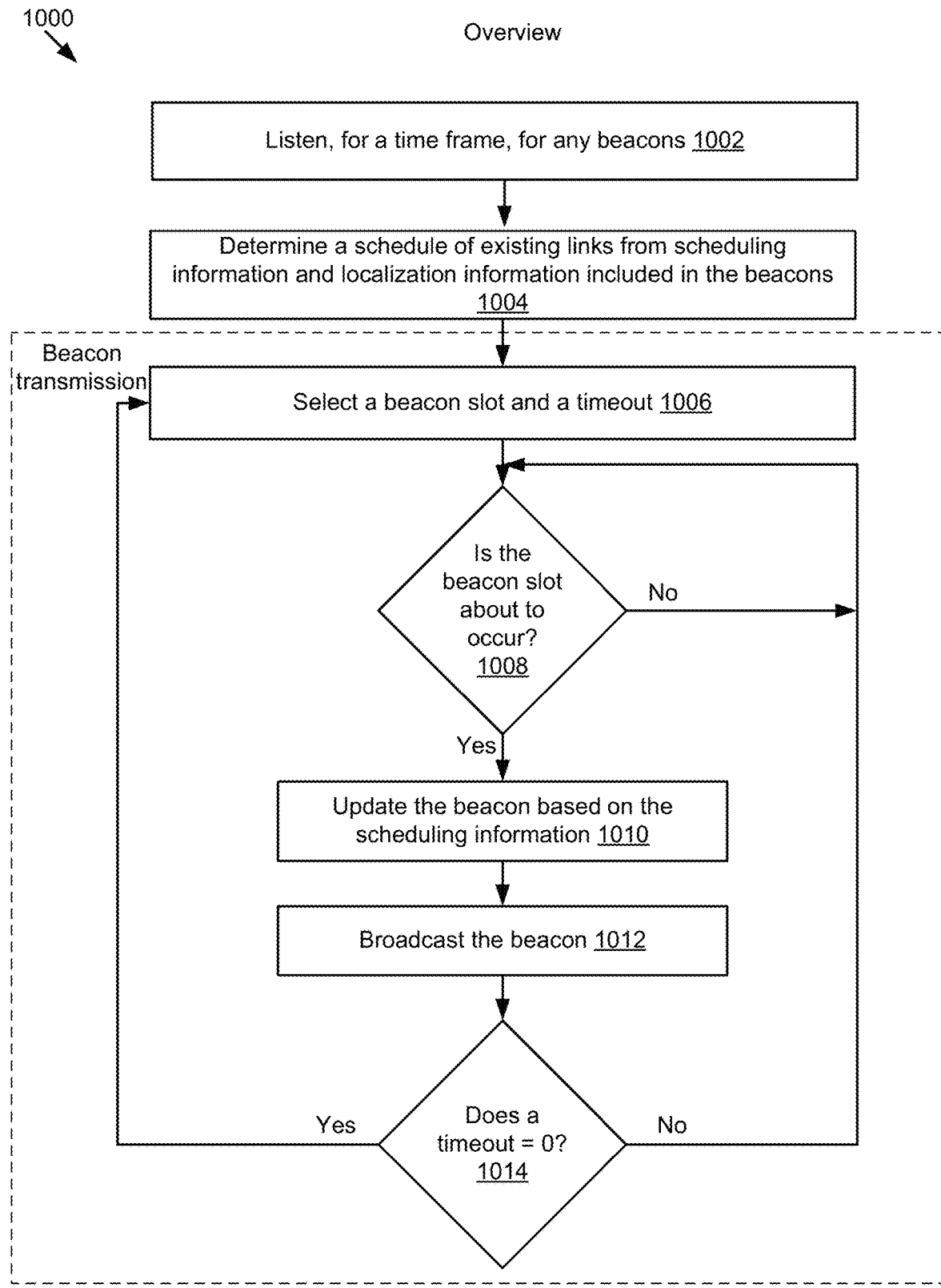
FIGS. 10A-10B are a flowchart of an example overview of the method for managing communications according to some embodiments.
Figure 10B:
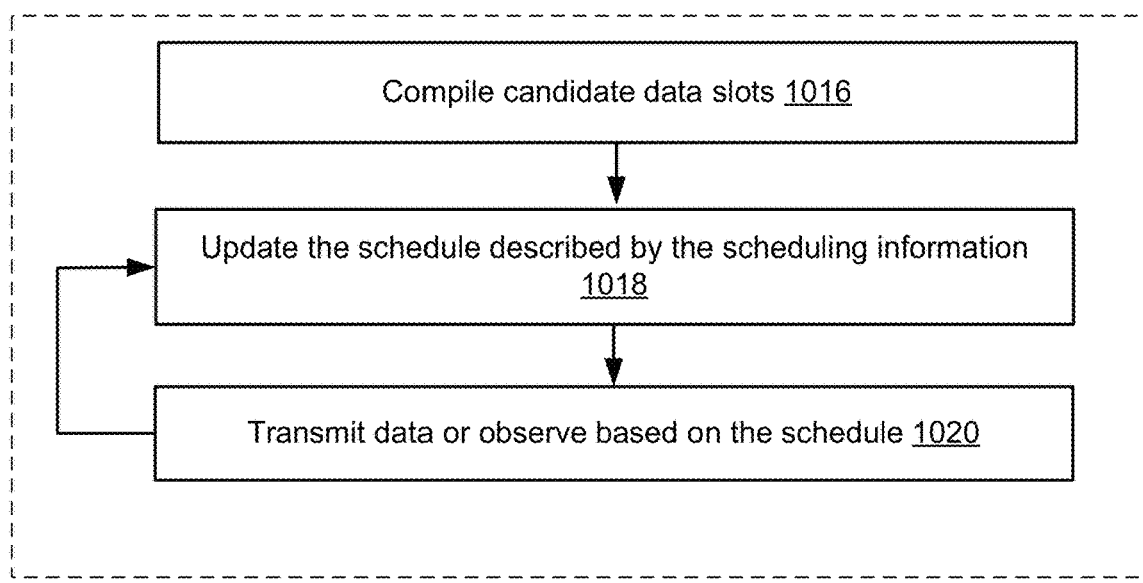

Referring now to FIGS. 10A-10B, depicted is a flowchart of an example overview of the method for managing communications according to some embodiments. One or more of the steps described herein for the method 1000 may be executed by the communication management system 199 of FIG. 1 and/or the computer system 200 of FIG. 2. Because a frame includes both beacons and data, the overview is divided into beacon transmission in FIG. 10A and data transmission in FIG. 10B.

At step 1002, for a time frame, beacons are listened for. For example, an ego vehicle 123 receives beacons from the first vehicle 121A and the nth vehicle 121N. The beacons include scheduling information and localization information. At step 1004, a schedule of existing links is determined from scheduling information and localization information included in the beacons. For example, the schedule includes different time slots for the existing links.

The beacon transmission is described by steps 1006 to 1014. At step 1006, a beacon slot and a timeout are selected. For example, the ego vehicle 123 selects a first beacon slot with a timeout of 30 seconds. At step 1008, it is determined whether the beacon slot is about to occur. If no, the method 1000 continues to wait until the beacon slot is about to occur. If the beacon slot is about to occur, at step 1010, the beacon is updated based on the scheduling information. At step 1012, the beacon is broadcasted.

At step 1014, it is determined whether the timeout equals zero. If the timeout does not equal zero, the method 1000 proceeds to step 1008. If the timeout does equal zero, the method 1000 proceeds to step 1006.

The data transmission is described by steps 1016-1020. At step 1016, candidate data slots are compiled. At step 1018, the schedule described by the schedule information is updated. At step 1020, the data is transmitted or observed based on the schedule.

Figure 11A:
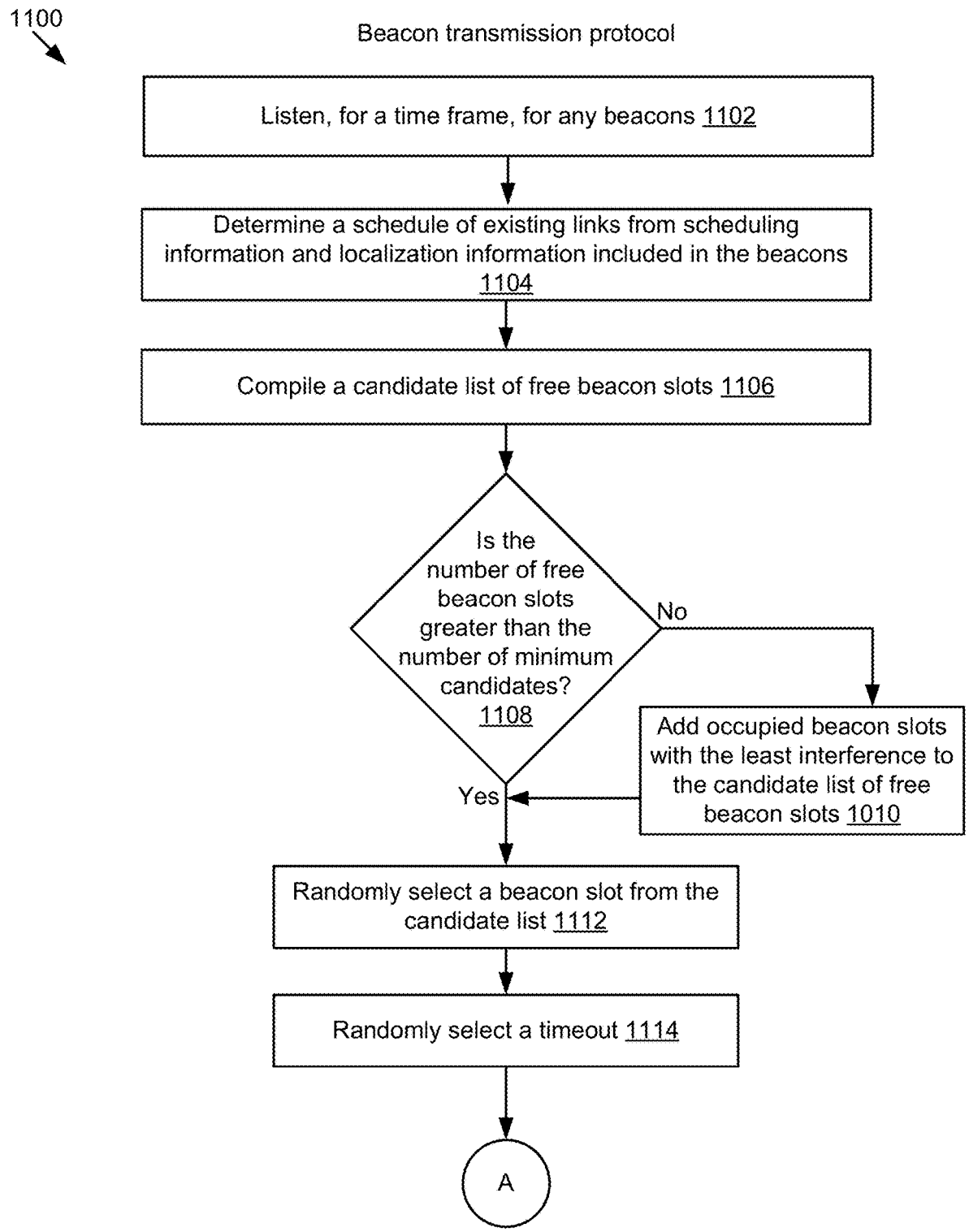
FIGS. 11A-11B are a flowchart of an example method based on a beam transmission protocol according to some embodiments.
Figure 11B:
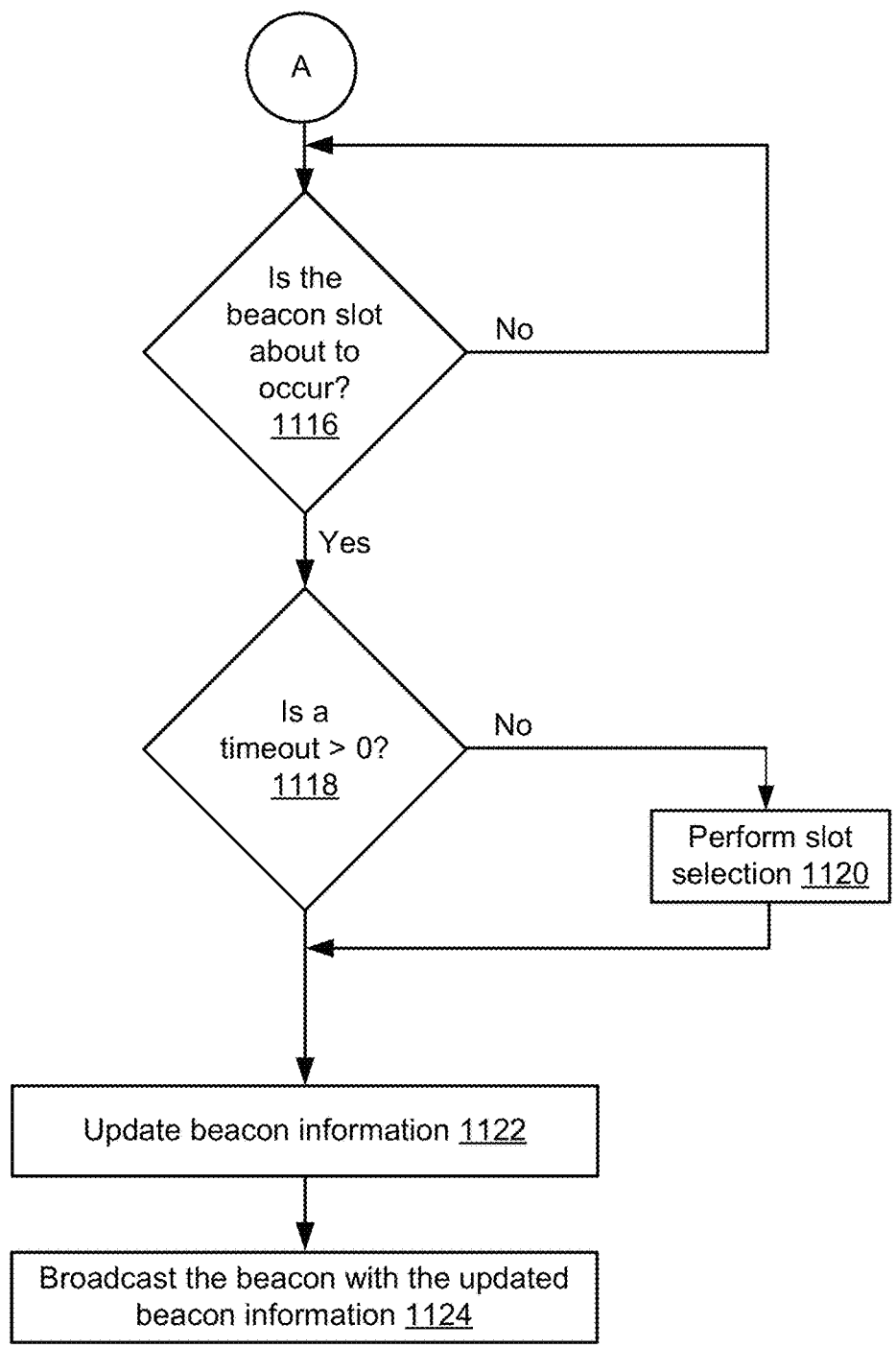

FIGS. 11A-11B are a flowchart of an example method 1100 based on a beam transmission protocol according to some embodiments. FIGS. 11A-11B illustrate one example of the beacon transmission described in FIG. 10A. One or more of the steps described herein for the method 1100 may be executed by the communication management system 199 of FIG. 1 and/or the computer system 200 of FIG. 2.

At step 1102, for a time frame, beacons are listened for. At step 1104, a scheduling of existing links are determined from scheduling information and localization information included in the beacons. At step 1106, a candidate list of free beacon slots are compiled.

At step 1108, it is determined whether the number of free beacon slots are greater than the minimum number of candidates. This may be a system parameter selected by the user. If the number of free slots are less than the number of minimum candidates, at step 1110, occupied beacon slots with the least interference are added to the candidate list of free beacon slots. For example, the beacon module 204 may select a number of occupied beacon slots that will result in the number of free beacon slots being greater than the number of minimum candidates. Next, the method 1100 proceeds to step 1112.

If the number of beacon slots is greater than the number of minimum candidates, a beacon slot is randomly selected from the candidate list. At step 1114, a timeout is randomly selected. At step 1116, it is determined whether the beacon slot is about to occur. If the beacon slot is not about to occur, the method 1100 continued to check whether the beacon slot is about to occur. If the beacon slot is about to occur, at step 1118, it is determined whether the timeout is greater than 0. If the timeout is not greater than 0, at step 1120, slot selection is performed and the method 1100 proceeds to step 1122. If the timeout is greater than 0, at step 1122, beacon information is updated. At step 1124, the beacon is broadcasted with the updated beacon information.

Figure 12A:
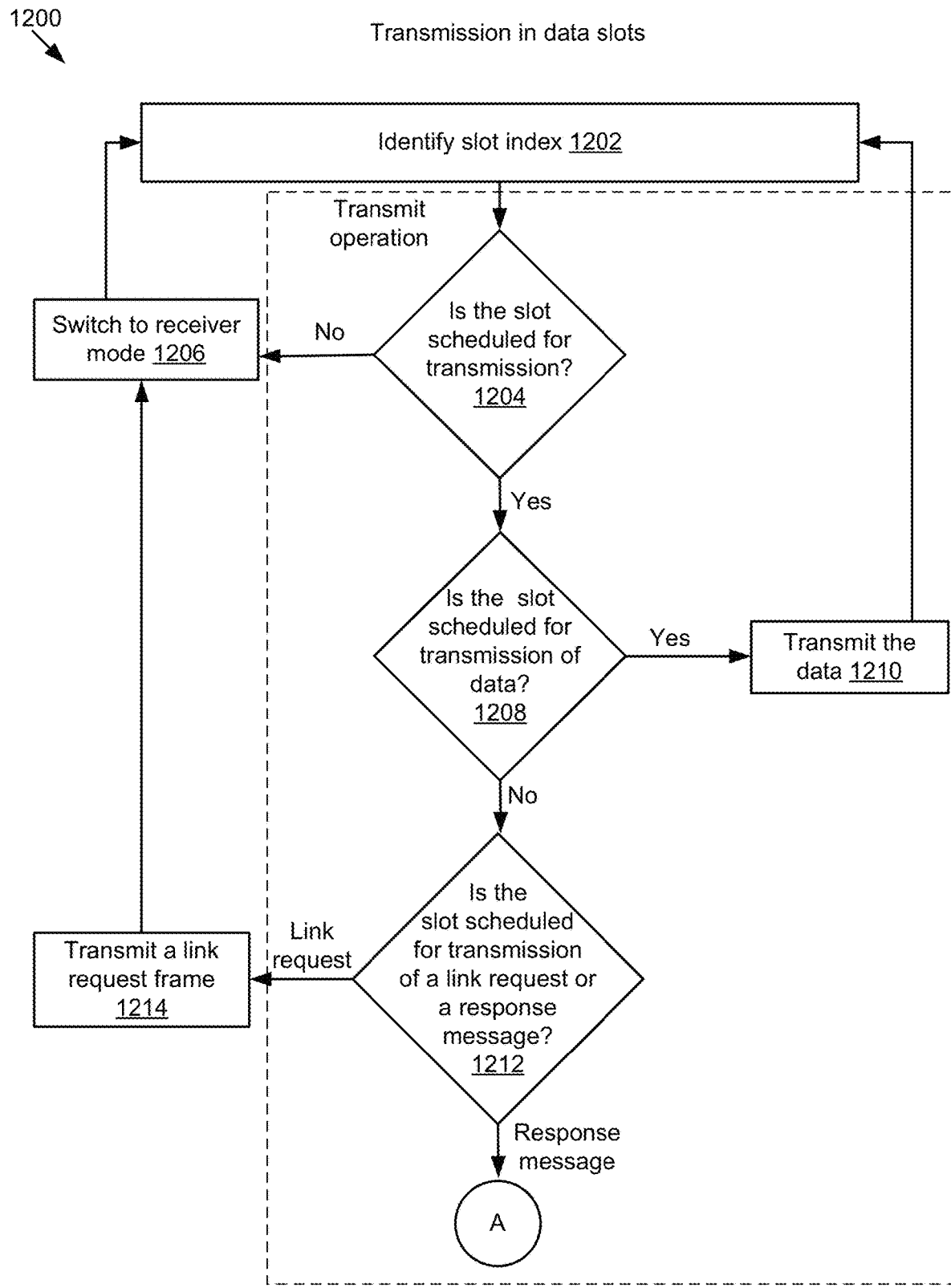
FIGS. 12A-12B are a flowchart of an example method of the transmission of data using data slots according to some embodiments.
Figure 12B:
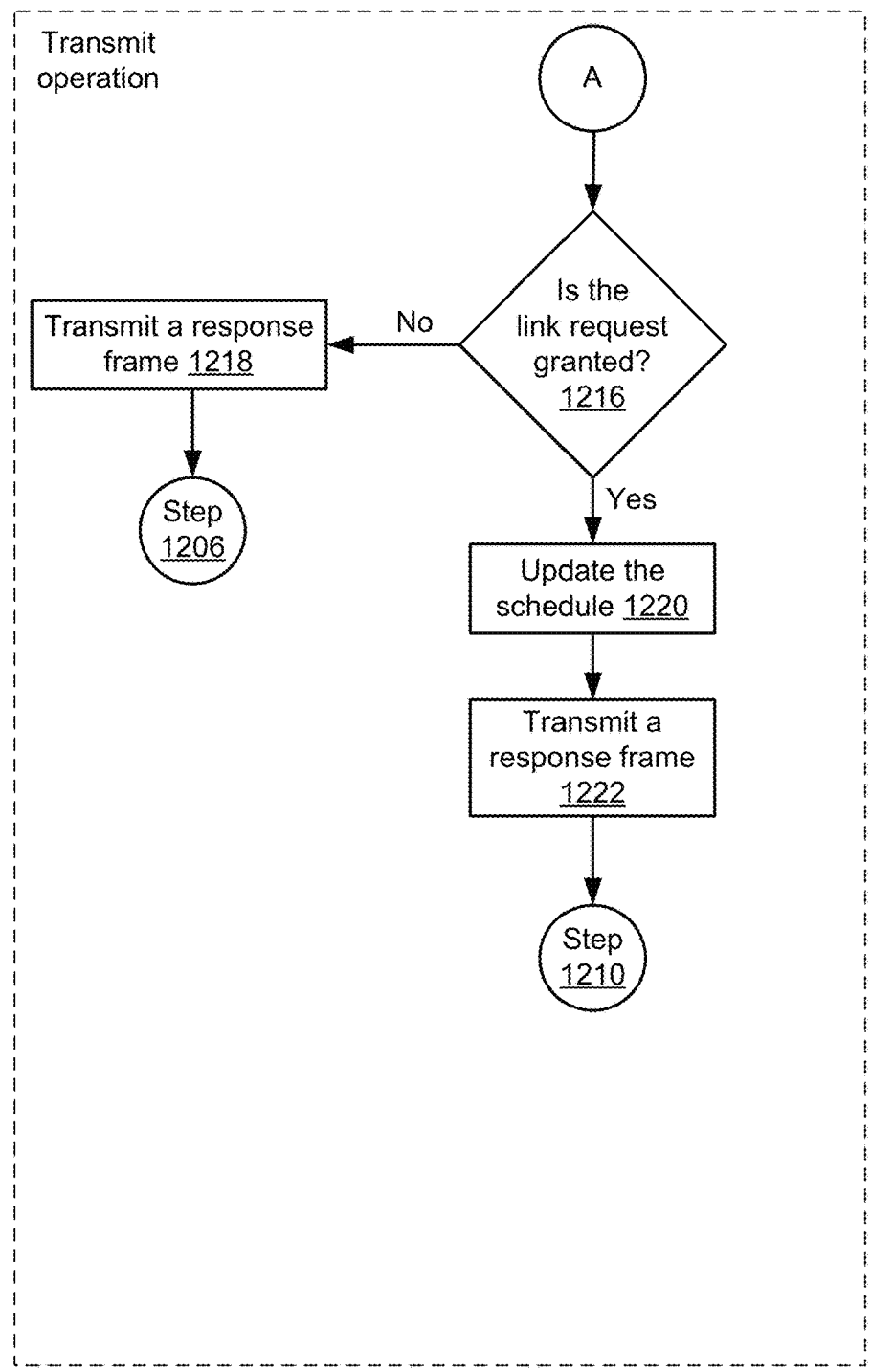

FIGS. 12A-12B are a flowchart of an example method 1200 of the transmission of data using data slots according to some embodiments. One or more of the steps described herein for the method 1200 may be executed by the communication management system 199 of FIG. 1 and/or the computer system 200 of FIG. 2. Steps 1204 and 1208-1222 are part of a transmit operation.

At step 1202, a slot index is identified. At step 1204, it is determined whether the slot is scheduled for transmission. For example, the method 1200 determines whether the slot is scheduled for transmission based on the slot index and the current time. If the slot is not scheduled for transmission, at step 1206, the method 1200 switches to receiver mode and the method 1200 moves to step 1202. The receiver mode corresponds to steps 1308-1316 described below with reference to FIG. 13.

If the slot is scheduled for transmission, at step 1208, it is determined whether the slot is scheduled for transmission of data. If the slot is scheduled for transmission of data, the method 1200 proceeds to step 1210, where the data is transmitted. After the data is transmitted, the method 1200 proceeds to step 1202.

If the slot is not scheduled for transmission of data, the method 1200 proceeds to step 1212, where it is determined whether the slot is scheduled for transmission of a link request or a response message. If the slot is scheduled for transmission of a link request, at step 1214, a link request frame is sent and the method 1200 proceeds to 1206.

If the slot is scheduled for transmission of a response message, at step 1216, it is determined whether a link request was granted. If the link request was not granted, at step 1218, a response frame is transmitted and the method 1200 proceeds to step 1206. If the link request is granted, at step 1220, the schedule is updated. At step 1222, a response frame is transmitted. The method 1200 then proceeds to step 1210 to transmit the data.

Figure 13:
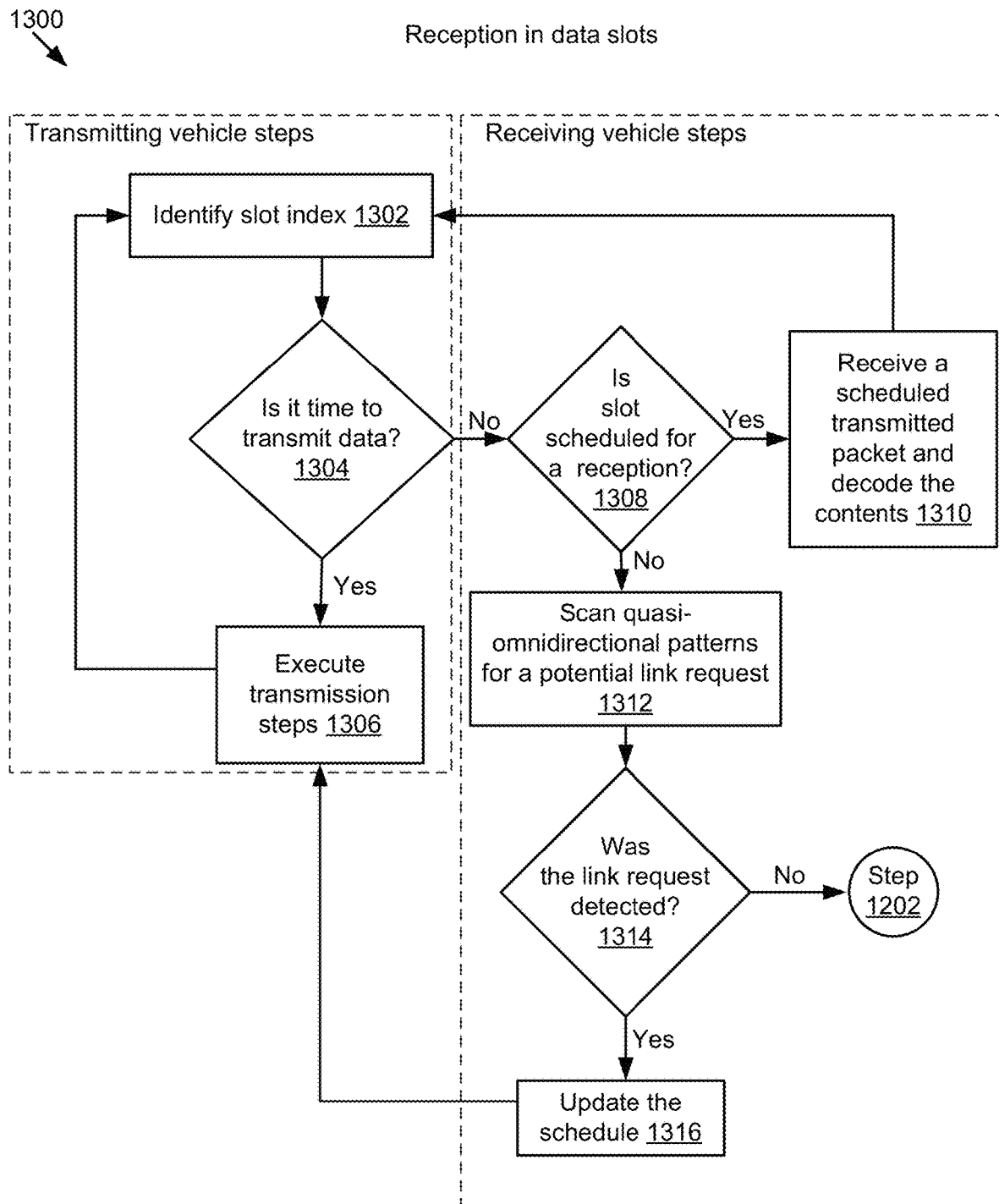
FIG. 13 is a flowchart of an example method of the reception of data using data slots according to some embodiments.

FIG. 13 is a flowchart of an example method 1300 of the reception of data using data slots according to some embodiments. One or more of the steps described herein for the method 1300 may be executed by the communication management system 199 of FIG. 1 and/or the computer system 200 of FIG. 2. Steps 1302-1306 are performed by the communication management system 199 associated with a vehicle that transmits the data. Steps 1308-1316 are performed by the communication management system 199 associated with a vehicle that receives the data.

At step 1302, a slot index is identified. At step 1304, it is determined whether it is time to transmit data. If it is time to transmit the data, at step 1306, transmission steps are executed. The transmission steps correspond to steps 1204 and 1208-1222 of FIG. 12A as described above. The method 1300 then proceeds to step 1302.

If it is not time to transmit data, at step 1308, it is determined whether the slot is scheduled for a reception. If the slot is scheduled for a reception, at step 1310, a scheduled transmitted packet is received and its contents are decoded.

If the slot is not scheduled for a reception, at step 1312, quasi-omnidirectional patterns are scanned for a potential link request. At step 1314, it is determined whether the link request was detected. If the link request was detected, at step 1316, the schedule is updated. For example, the schedule is updated to reserve this slot for the received request. The method 1300 then proceeds to 1306 to prepare to transmit a response packet back to the requested. If the link request was not detected, the method proceeds to step 1302.

Figure 14:
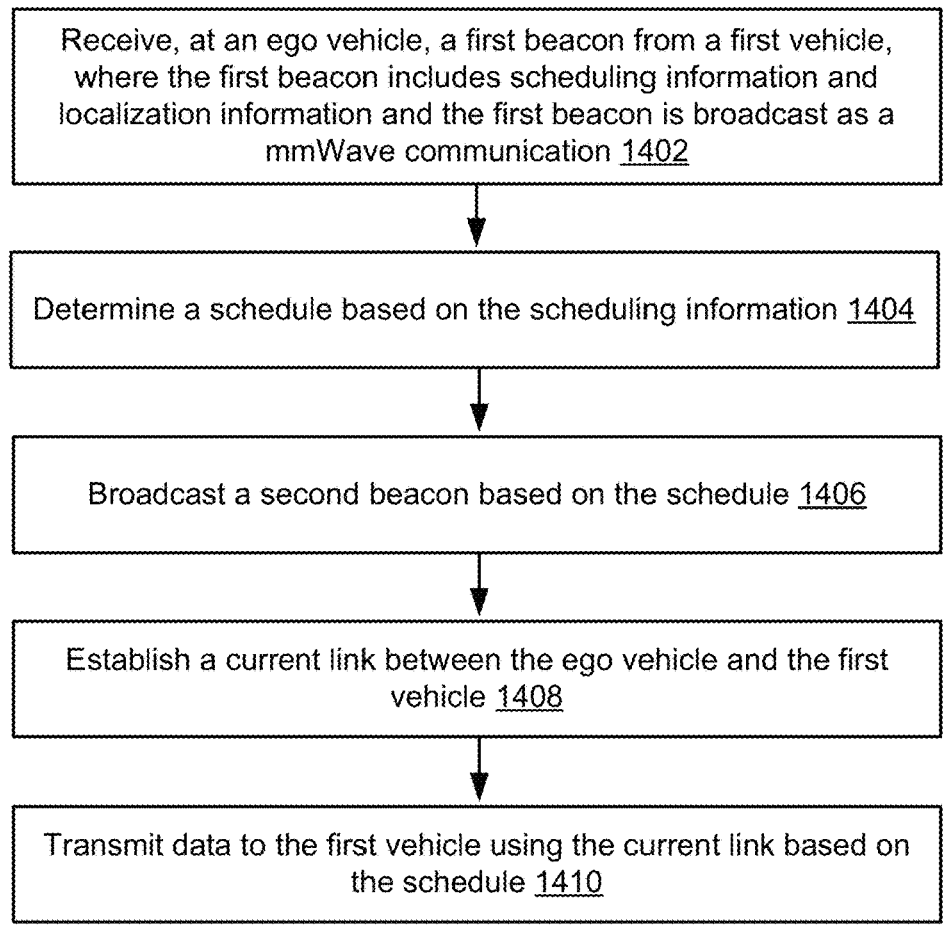
FIG. 14 is a flowchart of an example method for managing millimeter wave (mmWave) communications according to some embodiments.

FIG. 14 is a flowchart of an example method 1400 for managing mmWave communications according to some embodiments. One or more of the steps described herein for the method 1200 may be executed by the communication management system 199 of FIG. 1 and/or the computer system 200 of FIG. 2.

At step 1402, a first beacon from a first vehicle is received, where the first beacon includes scheduling information and localization information and the first beacon is broadcast as a mmWave communication. At step 1404, a schedule is determined based on the scheduling information. At step 1406, a second beacon is broadcast based on the schedule. At step 1408, a current link is established between the ego vehicle 123 and the first vehicle 121A. At step 1410, data is transmitted to the first vehicle using the current link based on the schedule.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
receiving, at an ego vehicle, a first beacon from a first vehicle, wherein the first beacon includes first scheduling information and first localization information and the first beacon is broadcast as a millimeter wave (mmWave) communication;
determining a schedule based on the first scheduling information;
broadcasting a second beacon based on the schedule;
establishing a current link between the ego vehicle and the first vehicle; and
transmitting data to the first vehicle using the current link based on the schedule.

2. The method of claim 1, wherein the first localization information is a first position of the first vehicle and first speed of the first vehicle.

3. The method of claim 1, wherein the second beacon includes that includes second scheduling information and second localization information and further comprising:
generating a data structure that includes the first scheduling information, the first localization information, the second scheduling information, and the second localization information.

4. The method of claim 1, further comprising:
responsive to receiving the first beacon, determining whether a new link will interfere with the current link; and
responsive to the new link not interfering with the current link, establishing the new link.

5. The method of claim 4, wherein determining whether the new link will interfere with the current link is based on the first scheduling information and the first localization information to avoid interference between the current link and the new link.

6. The method of claim 1, wherein the ego vehicle uses a slot counter to determine an available slot and further comprising:
transmitting a link request before establishing the current link with the first vehicle.

7. The method of claim 1, wherein the ego vehicle receives the first beacon quasi-omnidirectionally and the ego vehicle broadcasts the second beacon omni-directionally.

8. A system comprising:
an onboard vehicle computer system of an ego vehicle that includes a non-transitory memory storing computer code which, when executed by the onboard vehicle computer system causes the onboard vehicle computer system to:
receive a first beacon from a first vehicle, wherein the first beacon includes first scheduling information and first localization information and the first beacon is broadcast as a millimeter wave (mmWave) communication;
determine a schedule based on the first scheduling information;
broadcast a second beacon based on the schedule;
establish a current link between the ego vehicle and the first vehicle; and
transmit data to the first vehicle using the current link based on the schedule.

9. The system of claim 8, wherein the first localization information is a first position of the first vehicle and first speed of the first vehicle.

10. The system of claim 8, wherein the second beacon includes that includes second scheduling information and second localization information and the computer code further causes the onboard vehicle computer system to:
generate a data structure that includes the first scheduling information, the first localization information, the second scheduling information, and the second localization information.

11. The system of claim 8, wherein the computer code further causes the onboard vehicle computer system to:
responsive to receiving the first beacon, determine whether a new link will interfere with the current link; and
responsive to the new link not interfering with the current link, establish the new link.

12. The system of claim 11, wherein determining whether the new link will interfere with the current link is based on the first scheduling information and the first localization information to avoid interference between the current link and the new link.

13. The system of claim 8, wherein the ego vehicle uses a slot counter to determine an available slot and the computer code further causes the onboard vehicle computer system to:
transmit a link request before establishing the current link with the first vehicle.

14. The system of claim 8, wherein the ego vehicle receives the first beacon quasi-omnidirectionally and the ego vehicle broadcasts the second beacon omni-directionally.

15. A non-transitory memory encoded with a computer program, the computer program comprising instructions that, when executed by one or more processors, cause the one or more processors to perform operations comprising:
receiving, at an ego vehicle, a first beacon from a first vehicle, wherein the first beacon includes first scheduling information and first localization information and the first beacon is broadcast as a millimeter wave (mmWave) communication;
determine a schedule based on the first scheduling information;
broadcasting a second beacon based on the schedule;
establishing a current link between the ego vehicle and the first vehicle; and
transmitting data to the first vehicle using the current link based on the schedule.

16. The non-transitory memory of claim 15, wherein the first localization information is a first position of the first vehicle and first speed of the first vehicle.

17. The non-transitory memory of claim 15, wherein the second beacon includes that includes second scheduling information and second localization information and further comprising additional instructions stored on the non-transitory memory which, when executed by the one or more processors causes the one or more processors to execute additional operations comprising:
generating a data structure that includes the first scheduling information, the first localization information, the second scheduling information, and the second localization information.

18. The non-transitory memory of claim 15, further comprising additional instructions stored on the non-transitory memory which, when executed by the one or more processors causes the one or more processors to execute additional operations comprising:
responsive to receiving the first beacon, determining whether a new link will interfere with the current link; and
responsive to the new link not interfering with the current link, establishing the new link.

19. The non-transitory memory of claim 18, wherein determining whether the new link will interfere with the current link is based on the first scheduling information and the first localization information to avoid interference between the current link and the new link.

20. The non-transitory memory of claim 15, wherein the ego vehicle uses a slot counter to determine an available slot and further comprising additional instructions stored on the non-transitory memory which, when executed by the one or more processors causes the one or more processors to execute additional operations comprising:
transmitting a link request before establishing the current link with the first vehicle.

* * * * *